(12) United States Patent
Esashi et al.

(10) Patent No.: US 7,723,896 B2
(45) Date of Patent: May 25, 2010

(54) DRIVING MECHANISM USING SHAPE MEMORY ALLOYS INCLUDING A MAGNETIC LATCH

(75) Inventors: Masayoshi Esashi, 1-11-9, Yagiyamaminami, Taihaku-ku, Sendai-shi, Miyagi 982-0807 (JP); Yoichi Haga, 1-2-5-903, Kokubun-cho, Aoba-ku, Sendai-shi, Miyagi 980-0803 (JP); Masanori Mizushima, Sendai (JP); Tadao Matsunaga, Sendai (JP)

(73) Assignees: Japan Science and Technology Agency, Kawaguchi-shi (JP); Masayoshi Esashi, Sendai-shi (JP); Yoichi Haga, Sendai-shi (JP)

( * ) Notice: Subject to any disclaimer, the term of this patent is extended or adjusted under 35 U.S.C. 154(b) by 923 days.

(21) Appl. No.: 10/585,998

(22) PCT Filed: Jan. 19, 2005

(86) PCT No.: PCT/JP2005/000939

§ 371 (c)(1),
(2), (4) Date: Jul. 13, 2006

(87) PCT Pub. No.: WO2005/069254

PCT Pub. Date: Jul. 28, 2005

(65) Prior Publication Data

US 2008/0227060 A1 Sep. 18, 2008

(30) Foreign Application Priority Data

Jan. 20, 2004 (JP) ............................. 2004-012422

(51) Int. Cl.
*G09B 21/00* (2006.01)
*F03G 7/06* (2006.01)

(52) U.S. Cl. .................... 310/306; 60/527; 434/113; 359/291; 359/872; 385/18; 604/508; 604/528

(58) Field of Classification Search ............... 310/306, 310/307; 60/527; 434/112–114
See application file for complete search history.

(56) References Cited

U.S. PATENT DOCUMENTS 4,544,988 A * 10/1985 Hochstein ............... 361/211

(Continued)

FOREIGN PATENT DOCUMENTS

JP 60-178864 U 11/1985

(Continued)

OTHER PUBLICATIONS

Machine Translation of JP 2001-265213, "Braille Pin Drive Assembly", Esashi et al., Sep. 28, 2001.*

(Continued)

*Primary Examiner*—Karl I Tamai
(74) *Attorney, Agent, or Firm*—Westerman, Hattori, Daniels & Adrian, LLP

(57) ABSTRACT

A driving mechanism using shape memory alloys comprises a first and a second shape memory alloys coils (1, 2), a pin-like drive member (3) connected to each of the shape memory alloys coils (1, 2) extending in the axis direction, a substrate (4) having a wiring pattern (11) and a drive circuit (4*a*) to supply current to the shape memory alloys coils (1, 2), and a magnetic latch part (9) to hold the drive member (3), and the magnetic latch part (9) has a latch position in the axis direction of the drive member (3), the drive circuit (4*a*) selectively current-drives the first and the second shape memory alloys coils (1, 2), the driven first or second shape memory alloys coils (1, 2) is heated and compressed to move the drive member (3) in the axis direction, and magnetic bodies (9*a*, 9*b*) provided to the drive member (3) is magnetically fixed at the latch position, thereby fixed and held in the axis direction.

19 Claims, 18 Drawing Sheets

U.S. PATENT DOCUMENTS

| | | | |
|---|---|---|---|
| 4,887,430 A * | 12/1989 | Kroll et al. | 60/527 |
| 6,108,470 A * | 8/2000 | Jin et al. | 385/37 |
| 6,109,922 A * | 8/2000 | Litschel et al. | 434/114 |
| 6,206,888 B1 | 3/2001 | Bicek et al. | |
| 6,404,098 B1 * | 6/2002 | Kayama et al. | 310/307 |
| 6,428,173 B1 * | 8/2002 | Dhuler et al. | 359/872 |
| 6,705,868 B1 * | 3/2004 | Schleppenbach et al. | 434/114 |
| 2008/0227060 A1 * | 9/2008 | Esashi et al. | 434/113 |
| 2008/0307786 A1 * | 12/2008 | Hafez et al. | 60/527 |

FOREIGN PATENT DOCUMENTS

| | | | |
|---|---|---|---|
| JP | 6-301335 A | 10/1994 | |
| JP | 2001-265213 A | 9/2001 | |
| JP | 2002-207418 A | 7/2002 | |
| JP | 3684552 B2 | 8/2005 | |
| WO | WO 00/59404 A1 | 10/2000 | |

OTHER PUBLICATIONS

International Search Report of PCT/JP2005/000939, date of mailing Apr. 12, 2005.

Translation of International Preliminary Report on Patentability mailed Oct. 26, 2006, of International Application No. PCT/JP2005/000939.

* cited by examiner (a)    (b)

(a)

(b)

(a)  (b)  (c)

(a)

(b)

DRIVING MECHANISM USING SHAPE MEMORY ALLOYS INCLUDING A MAGNETIC LATCH

TECHNICAL FIELD

The present invention relates to a driving mechanism using shape memory alloys and various devices equipped with the same.

BACKGROUND ART

By the wide use of computers and cell phones, computerization of the letter and pattern information by using such as personal computer communication, internet, and electronic mails has been rapidly advancing.

In such information communities, it is regarded as desirable to use complementarily voice synthesis, an electronic Braille display, and others as the means to obtain information for visually impaired persons. As the electronic Braille display, the so far used so-called six dot Braille is adopted. However, among visually impaired persons, only about ten percent can read such six dot Braille. This is because midlife blinds are increasing among aged people due, for example, to diabetes, and since it requires much effort for aged people to learn Braille, many of them give up learning on midway.

On the other hand, a tactile display is known as one of the means to communicate information for midlife visually impaired persons which can display letter shapes (ink letters) and pattern information as the moving of respective pins, that is, information of convex and concave positions by arranging actively moving pins vertically on a two-dimensional plane. As the drive means of pins in said electronic Braille displays or tactile displays, for example, such drive means as electromagnetic, electrostatic, piezoelectric actuators are adopted, and they are made up by moving respective pins to convex or concave positions by these drive means. The one using an electromagnetic actuator, for example, as a drive means is disclosed in the Japanese Patent laid open application JP 2002-207418 A (Reference 1) and the one using a piezoelectric actuator as a drive means is disclosed in the Japanese Patent laid open application JP H6-301335 A (1994) (Reference 2).

However, in Reference 1, since pins are driven by electromagnetic force generated by a coil, the coil has to be small-sized if the whole of it is to be small, and hence the electromagnetic force is weak. If thin wire is used for a coil, an electrical resistance of the coil is high, and the power consumption increases. In case of Reference 2, there is such a problem that, in order to displace a pin by 1 mm or more by, for example, a planar piezoelectric bimorph device as a drive means, the piezoelectric bimorph device itself becomes large, and the tactile display itself becomes large-sized, as well as drive voltage is relatively high.

On the other hand, a Braille pin driving device which reduced driving power and simplified the structure is disclosed in the Japanese Patent laid open application JP 2001-265213 A (Reference 3). This Braille pin driving device utilizes coils made of shape memory alloys, displacing pins by, for example, extension motion upon turning on electricity, and fixing and holding a stopper attached to the pin at two displacing position, that is, at a convex and a concave positions, by contacting to the fixed and arranged magnetic plate for magnetically fixing.

However, the three dimensional assembly structure of the Braille pin driving device of Reference 3 is complex, and it would be difficult to decide pin positions upon assembly.

Here, as the pin driving system in the above-mentioned References 1-3, pins are arranged at intervals of about 2.5 mm pitch, for example, close to the Braille specification, as well as driven by a drive means between convex and concave positions, and fixed and held at convex and concave positions. Therefore, though it is possible to express the above-mentioned six dots Braille, narrower pitches are preferable for finer expression in case, for example, pattern expression is performed with a number of pins arranged as a dot matrix. If also respective pins are fixed and held at a plurality of positions with regard to their axis direction, multi-value display and so-called gradation expression are possible.

However, as the pin drive system in the above-mentioned References 1-3, respective pins are not so designed to be arranged at narrow pitches, or fixed and held at a plurality of positions with regard to their axis direction. Also, in case of pattern display with a number of pins, and respective pins are driven by a driving device with the electromagnetic actuator, there is such a problem that the display speed is slow, as well as the motion noise is relatively loud.

DISCLOSURE OF THE INVENTION

Referring to the above-mentioned problems, the object of the present invention is to offer a driving mechanism using shape memory alloys which can be assembled to a small size by simple composition, as well as a high speed motion is possible by especially easy integration, and further preferably, pins can be fixed and held at multi-steps, and various devices such as a display device equipped with the same, a write-in device equipped with the same, and the like.

The above-mentioned object will be attained, according to a first aspect of the present invention, by a driving mechanism using shape memory alloys comprising: a first and a second shape memory alloys coils connected mutually in series in the axis direction; a pin-shaped drive member connected to the first and the second shape memory alloys coils and extending in the axis direction; a drive circuit to supply electricity to the first and the second shape memory alloys coils; and a magnetic latch to hold the drive member, characterized in that the first and the second shape memory alloys coils are selectively heated by electrical driving by the drive circuit, the drive member is moved in the axis direction by compressing or extending of the heated first or the second shape memory alloys coils, and the drive member is fixed and held in the axis direction by magnetically fixing to the magnetic latch.

According to the above-mentioned aspect, in the driving mechanism using shape memory alloys, the drive member can be moved in the axis direction by compressing or extending by heating the first and the second shape memory alloys coils. When the drive member is moved in the axis direction, it is fixed and held at the latch position in the axis direction by the magnetic latch. Therefore, the driving mechanism is composed from the shape memory alloys coils and the drive member merely by connecting each electrode of the shape memory alloys coil to the wire pattern of the drive circuit. Since the drive member is fixed and held at the moving position by the magnetic latch, each drive member is fixed and held without always turning on electricity to the shape memory alloys coil, thereby power consumption, and hence the running cost, are reduced. Since each drive member is fixed and held at the position of axis direction corresponding to the plurality of magnetic bodies, it is fixed and held at the multi-step position of axis direction, not at two steps of convex and concave positions like in conventional Braille display device.

The magnetic latch preferably includes a magnetic plate with a penetration hole through which a drive member penetrates without contact, and a plurality of magnetic bodies provided to the drive member, and said magnetic body is located apart mutually in the axis direction of the drive member, and the magnetic plate is magnetized in the axis direction of the drive member. Since the drive member is fixed and held at the corresponding latch position in the axis direction, and the magnetic plate is magnetized in the axis direction of the drive member, even if a plurality of drive members are inserted through penetration holes of one magnetic plate, the same magnetization state can be obtained at each penetration hole.

Therefore, in case of a plurality of driving mechanisms arranged in line, magnets are not needed between respective drive members, and hence simple configuration is possible. Thereby, respective driving mechanisms can be arranged at narrow pitch, and the smaller size can be designed as a whole. Since the magnetic plates constituting magnetic latches are separated from a substrate, each substrate is arranged vertically for combining a plurality of substrates, and a magnetic plate may be put thereon, so that the assembly and the decomposition are easy resulting in the improved maintenance.

A driving mechanism using shape memory alloys of the present invention is comprising: a plurality of groups of a module with a first and a second shape memory alloys coils mutually connected in series in the axis direction; a drive and a fixing members arranged on a common substrate; and a magnetic latch part to a drive member, characterized in that; said first and second shape memory alloys coils are sequentially connected in series as a natural length part, its extended part, or compressed part of the first shape memory alloys coil, the extended part, or compressed part, and its natural length part of the second shape memory alloys coil in turn, the series-connected part of one end of the natural length part and one end of the extended or compressed part of each of said first and second shape memory alloys coils is connected to the drive member via the fixing member arranged in an aperture part provided to said substrate, and said first and second shape memory alloys coils, said drive member, and said fixing member are movably held about in parallel to said substrate without contact to said substrate, the other end of the natural length part of said first shape memory alloys coil and the other end of the natural length part of said second shape memory alloys coil are respectively connected to a ground electrode pattern provided to said substrate, the other end of the extended or the compressed part of said first shape memory alloys coil and the other end of the extended or the compressed part of said second shape memory alloys coil are connected to a common electrode wiring pattern provided to said substrate, said magnetic latch part includes a magnet plate and a plurality of magnetic bodies, said magnet plate is provided with a penetration hole through which said drive member penetrates without contact, and said magnetic bodies are mutually arranged separately in the axis direction, and a drive circuit provided to said substrate selectively current-drives said first and second shape memory alloys coils, said drive member moves in the axis direction by extending or compressing said driven first or second shape memory alloys coils by heating, and said drive member is magnetically fixed to said magnetic latch part, thereby fixed and held at multi-steps in the axis direction.

According to this aspect, since plural groups of the first and the second shape memory alloys coils, the drive and the fixing members are provided to the common substrate and magnetic plate, narrower pitches between groups are possible.

The driving mechanism using shape memory alloys in accordance with the present invention is such that the drive circuit preferably has a shift resistor, and the plurality of groups of the first and the second shape memory alloys coils are current-driven by this shift resistor. Since the data is sent out by the shift resistor using one drive circuit, and plural groups of the first and the second shape memory alloys coils can be electrically driven, the whole configuration is simplified, resulting in the reduced cost. Since also the serial data is sent out from the drive circuit, and respective group of the first and the second shape memory alloys coils can be electrically driven, respective group of the first and the second shape memory alloys coils can be driven at high speed. Further, only one wire is enough for data transfer, increase of wires for data transfer is not required in case to connect a plurality of shift resistors because they are connected in so-called cascade connection, thereby a simple configuration will be attained.

The driving mechanism using shape memory alloys is such that the magnetic latch is preferably comprising one or more magnetic bodies provided to the drive member, and a latch member provided with a plurality of concave parts mutually arranged separately in the axis direction facing the displacement region of said magnetic bodies, and the concave part region of said latch member is magnetized. Therefore, when the drive member moves in the axis direction, the magnetic body of the magnetic latch provided on the drive member is magnetically fixed in any one of a plurality of concave portions provided to the latch member, and thereby the drive member is fixed and held at the corresponding latch position in the axis direction.

The above-mentioned object will also be attained, according to a second aspect of the present invention, by a display device equipped with the driving mechanism, comprising: at least one driving mechanism using shape memory alloys; a display sheet arranged in parallel to a magnet plate and having a penetration hole through which each drive member penetrates vertically; and a control part into which data is input, characterized in that; said driving mechanism is provided with a plurality of groups of a module wherein a first and a second shape memory alloys coils mutually connected in series in the axis direction, a drive member, and a fixing member are arranged on one common substrate, and a magnetic latch part to hold said drive member, said first and second shape memory alloys coils are sequentially connected in series as a natural length part, its extended part, or compressed part of the first shape memory alloys coil, the extended part, or compressed part, and its natural length part of the second shape memory alloys coil in turn, the series-connected part of one end of the natural length part and one end of the extended or compressed part of each of said first and second shape memory alloys coils is connected to the drive member via the fixing member arranged in an aperture part provided to said substrate, and said first and second shape memory alloys coils, said drive member, and said fixing member are movably held about in parallel to said substrate without contact to said substrate, the other end of the natural length part of said first shape memory alloys coil and the other end of the natural length part of said second shape memory alloys coil are respectively connected to a ground electrode pattern provided to said substrate, the other end of the extended or the compressed part of said first shape memory alloys coil and the other end of the extended or the compressed part of said second shape memory alloys coil are connected to a common electrode wiring pattern provided to said substrate, said magnetic latch part includes a magnet plate and a plurality of magnetic bodies, said magnet plate is provided with a penetration hole through which said drive member penetrates without contact, and said magnetic bodies are mutually arranged separately in the axis direction, a drive circuit provided to said substrate selectively current-drives said first and second shape memory alloys coils, said drive member moves in the axis direction by extending or compressing said driven first or second shape memory alloys coils by heating, and said drive member is magnetically fixed to said magnetic latch part, thereby fixed and held at multi-steps in the axis direction, and a display is conducted by the protruding quantity of each drive member corresponding to said data.

According to the above-mentioned second aspect, by using at least one driving mechanism using shape memory alloys, the display of, for example, Braille is possible by combination of protruding quantity of drive members based on the protruding quantity from the surface of display sheet at the tip of the drive member in these driving mechanisms. In this case, since drive current of the first and the second shape memory alloys coils of respective driving mechanism is not required after respective drive members are moved, the power consumption is very small. Since also the intervals of respective drive members can be made narrower, the smaller display is possible. Further, since the drive members of respective driving mechanisms are fixed and held in the axis direction position corresponding to a plurality of magnetic bodies, a graduated display is possible based on the protruding quantity on the display sheet at the axis direction positions of more multiple steps, not the two step display like a convex and a concave positions in conventional Braille display device.

The tips of the respective drive members in said driving mechanisms are preferably arranged in a dot matrix on the surface of the display sheet. By increasing the arrangement intervals of drive members and their numbers, the pattern display with high resolution is possible.

Further, according to the third aspect of the present invention, the above-mentioned object can be attained by a display sheet write-in device equipped with a driving mechanism using shape memory alloys characterized in that it is comprising: at least one drive mechanism made up by the above-mentioned second aspect; a detachable display sheet arranged in parallel to a magnet plate and having a penetration hole through which each drive member penetrates vertically in the tip region of each drive member of the driving mechanism; a display pin detachably inserted into the tip of each drive member; and a control part into which data is input and write-in is conducted on said display sheet by the protruding quantity of each display pin corresponding to said data, and the display pin is latched to the display sheet depending upon the axis direction moving quantity of said each drive member, the display pin is detached from the drive member by magnetism of the latch part, thereby is fixed and held to the display sheet. According to said display sheet write-in device, a display sheet in which data is written in can be obtained.

According to the above-mentioned third aspect, the display pin is latched on the magnetic plate of the display sheet by combination of the protruding quantity of respective drive members, thereby the display of Braille and others can be written in. Since the display pin is latched on a magnetic plate and hence non-volatile, the data can be any time detected by touching. Since the display sheet can be detached form the write-in device, the write-in is possible to the similar display sheet, and the display sheets can be handled as if printing paper. After the data of the display sheet is detected, the data can be deleted by returning the display pin to the unprotruded state.

Another embodiment of a driving mechanism using shape memory alloys of the present invention is characterized in that it is comprising: a first and a second shape memory alloys coils mutually connected in series in the axis direction; a drive member made of a magnetic body material connected to said first and second shape memory alloys coils; a drive circuit to supply electric current to said first and second shape memory alloys coils; and a magnetic latch part to hold said drive member, characterized in that; said magnetic latch part has a plurality of concave parts mutually arranged separately in the axis direction, and said concave part region is magnetized, said first and second shape memory alloys coils are selectively current-driven and heated by said drive circuit, and said drive member is moved along a plurality of concave parts of the latch part by compressing or extending said heated first or second shape memory alloys coil, and said drive member is magnetically fixed to said magnetic latch part, thereby fixed and held.

In the above-mentioned aspect, the first and the second shape memory alloys coils preferably comprise a extended part or a compressed part, the ends of the extended or the compressed part of said first and second shape memory alloys coils are mutually connected in series, the series-connected part of said first and second shape memory alloys coils is connected to said drive member to be a common electrode, both ends not series-connected of the extended or the compressed part of said first and second shape memory alloys coils are connected to both ends where are not provided a plurality of concave parts of said latch member to be a ground electrode. According to this aspect, when the drive member made of the magnetic material moves in the axis direction by extension and compression of the shape memory alloys coil, the drive member is fixed and held at the corresponding latch position in the axis direction by magnetic fixation in any one of a plurality of concave parts arranged on the latch member. If said driving mechanism using shape memory alloys is equipped to such various devices as an optical fiber switch, a focus adjusting mechanism of a lens, a liquid injector, a matrix type optical switch to selectively drive many mirrors, various devices of extreme merit are realized.

In a driving mechanism using shape memory alloys of the present invention, the concave part is preferably arranged as a bending shape. Therefore, since the magnetic body moves along the bending concave part accompanying the movement of the drive member, and is fixed and held at the corresponding latch position by magnetic fixation in any of the concave parts, the drive member is fixed and held at any of latch positions curved and arranged in line, and, for example, a latch mechanism in the bended member can be realized.

The concave part of said driving mechanism may be made flexible to bend. In this case, since said magnetic body moves along the concave parts arranged in bending shape, accompanying the movement of a drive member, magnetically fixed in any of the concave parts, and is fixed and held at the corresponding latch position, a latch mechanism, for example, in a tube such as a flexible catheter can be realized.

When said latch member is provided with a magnetic sensor, the position where said magnetic body moved can be detected, following the movement and setting of a drive member. Also, it can be used as an input device of the position by setting the position of a drive member.

Further, an optical device equipped with a driving mechanism using shape memory alloys and a drive part driven by said driving mechanism, characterized in that; said driving mechanism comprising: a first and a second shape memory alloys coils mutually connected in series in the axis direction; a drive member made of a magnetic body material connected to said first and second shape memory alloys coils; a drive circuit to supply electric current to said first and second shape memory alloys coils; and a magnetic latch part to hold said drive member, and said magnetic latch part has a plurality of concave parts mutually arranged separately in the axis direction, and said concave part region is magnetized, said first and second shape memory alloys coils are selectively current-driven and heated by said drive circuit, and said drive member is moved along a plurality of concave parts of said latch part by compressing or extending said heated first or second shape memory alloys coil, said drive member is magnetically fixed to said magnetic latch part, thereby fixed and held, and the drive part of said optical device is fixed by the drive member made of a magnetic body material of said driving mechanism, and its position is drive-controlled. The drive part of said optical device is preferably that of an optical fiber or of a lens.

According to the above-mentioned aspect, the optical fiber and lens of the optical device can be driven, using said driving mechanism, based on the latch position of the drive member. In this case, since the drive current of the first and the second shape memory alloys coils of each driving mechanism is no longer necessary after once each drive member has been moved, the power consumption is very small. Since the movement is large and can be made to multi-steps in every case, the driving mechanism can be applied to such various devices as optical fiber switch and the focus adjusting mechanism of a lens. The driving mechanism of these optical devices can be made compact and integrated with high density.

Further, a catheter equipped with the driving mechanism of the present invention, of which the driving mechanism using shape memory alloys comprising: a first and a second shape memory alloys coils mutually connected in series in the axis direction; a drive member made of a magnetic body material connected to said first and second shape memory alloys coils; a drive circuit to supply electric current to the first and second shape memory alloys coils; and a magnetic latch part to hold said drive member, and the magnetic latch part has a plurality of concave parts mutually arranged separately in the axis direction, and the concave part region is magnetized, the first and second shape memory alloys coils are selectively current-driven and heated by the drive circuit, and the drive member is moved along a plurality of concave parts of the latch part by compressing or extending the heated first or second shape memory alloys coil, and the drive member is magnetically fixed to the magnetic latch part, thereby fixed and held.

According to the above-mentioned aspect, the tip of the catheter or the endoscope can be driven, using said driving mechanism, based on the latch position of the drive member. In this case, since the drive current of the first and the second shape memory alloys coils of each driving mechanism is no longer necessary after once each drive member has been moved, the power consumption is very small.

According to the present invention, in the driving mechanism using shape memory alloys coils, the shape memory alloys coils are connected electrically and mechanically, and the drive member of each driving mechanism fixed to the shape memory alloys coil and driven can be fixed and held, that is, latched in the axis direction position corresponding to a plurality of magnetic bodies. Since this latched state is maintained without electric current in the shape memory alloys coil, the power consumption is very small. In addition, a gradated display of multi-step more than in the axis direction position is possible, not the two step display of conventional convex and concave positions.

The drive member is also made small by planarly constructed with regard to the displacement of the shape memory alloys coil, thereby can be easily integrated. Since a thin shape memory alloys coil can be used, low power consumption is possible by the low current operation, and the surface area/volume ratio is made low, resulting in a short time constant upon heat dissipating and a high speed operation.

Said display device equipped with said driving mechanism is such that the driving mechanism using said shape memory alloys coil is modularized, the multi-step gradated display is possible more than at the axis direction position of one dimensional or two dimensional arrangement, the data can be written in to a detachable display sheet, and operates with a low power consumption and a high speed.

The display sheet write-in device equipped with said driving mechanism is such that the driving mechanism using said shape memory alloys coil is modularized, the multi-step gradated display is possible more than at the axis direction position of one dimensional or two dimensional arrangement, the data can be written in to a detachable display sheet, and operates with a low power consumption and a high speed.

The optical device equipped with said driving mechanism is such that the driving parts in the optics such as optical fiber and lenses can be driven, and operates with a low power consumption and a high speed.

The catheter equipped with said driving mechanism is such that the various driving mechanisms of the catheter can be driven, and operates with a low power consumption and a high speed.

BRIEF DESCRIPTION OF THE DRAWINGS

FIG. 4 is a view illustrating the operation of the driving mechanism using shape memory alloys as the first form of embodiment, and (a) shows the unheated state, (b) shows the shape memory alloys coil 2 with electric current turned on, and (c) shows the shape memory alloys coil 1 with electric current turned on.

BEST MODES FOR CARRYING OUT THE INVENTION

Figure 1:
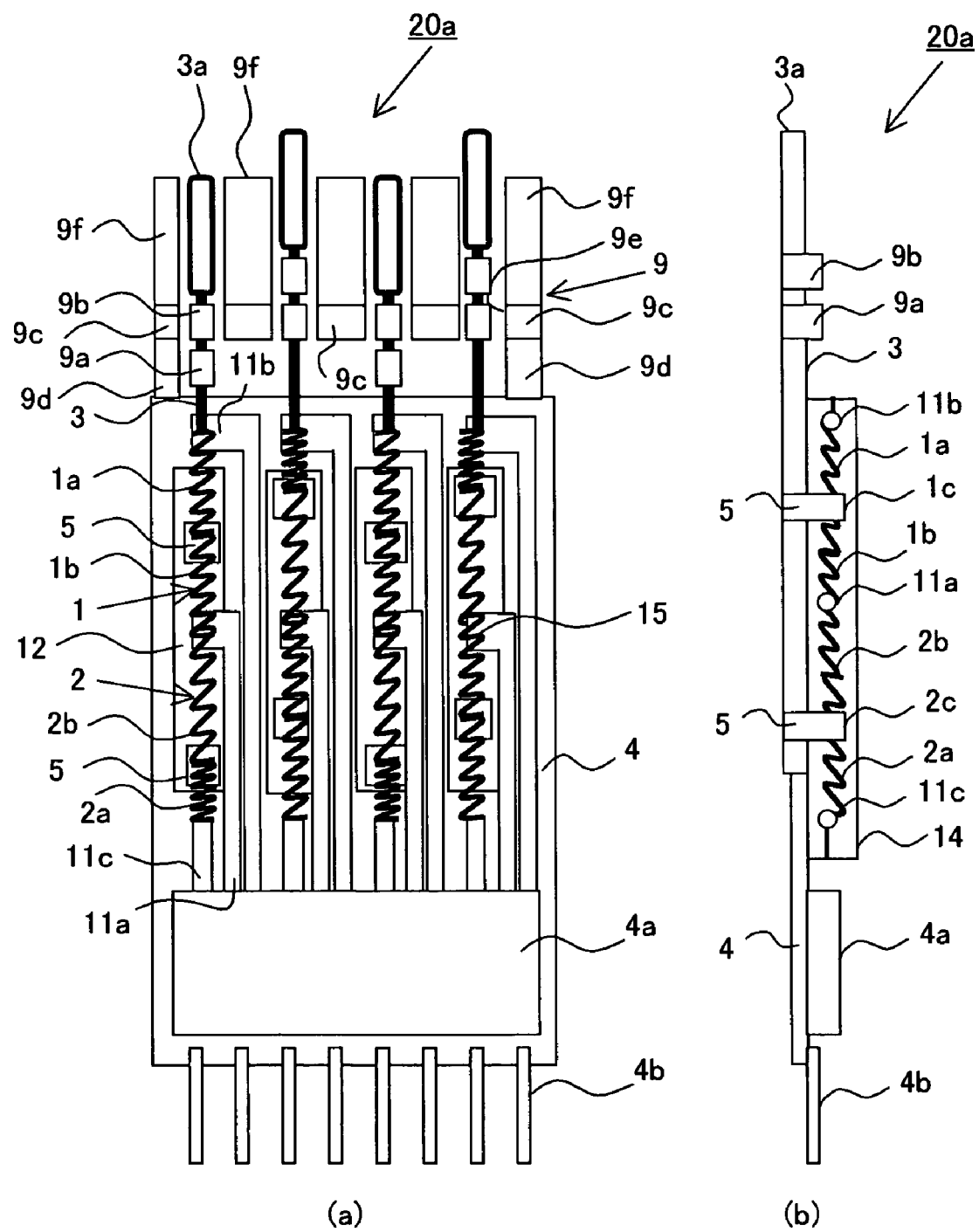
FIG. 1 is a view illustrating the configuration of a driving mechanism using shape memory alloys as the first form of embodiment of the present invention.

Hereinafter, the present invention will be explained in detail with reference to the drawing figures attached hereto illustrating several embodiments. In the figures, same marks and symbols are used for identical or corresponding members.

First of all, a first form of embodiment of a driving mechanism using shape memory alloys of the present invention will be explained.

Figure 2:
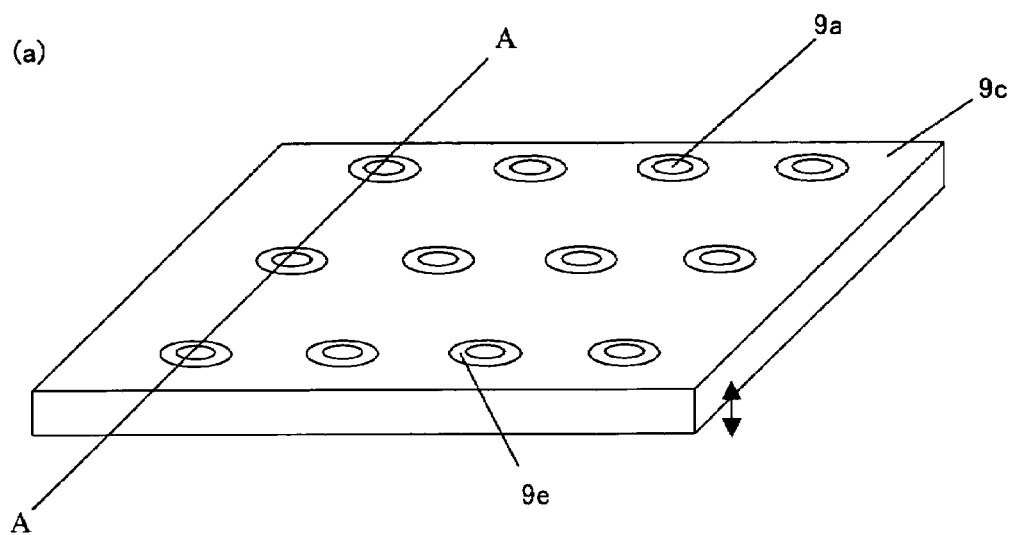
FIG. 2 is a view illustrating the configuration of a magnetic plate in a driving mechanism module using shape memory alloys, and (A) is a partial perspective view, and (B) is a cross-sectional view.
Figure 2:
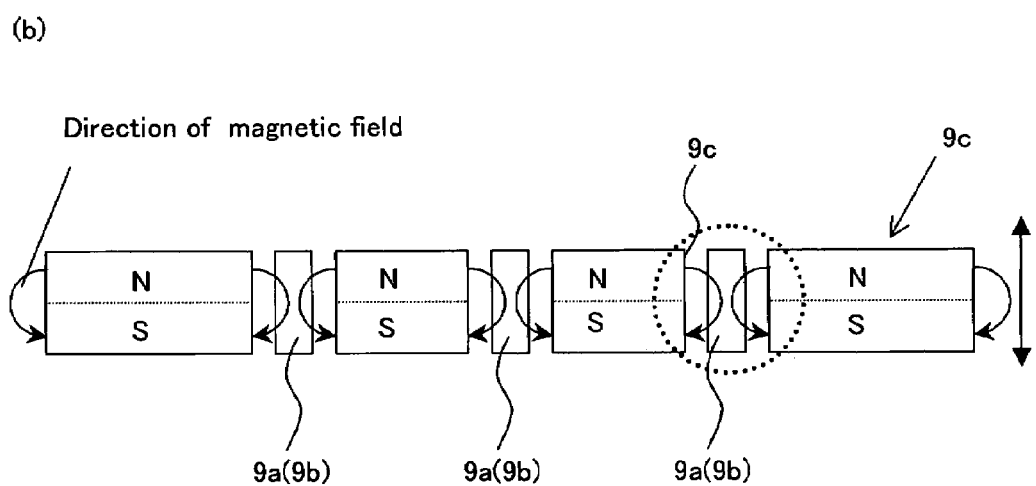

FIGS. 1 and 2 illustrate a first form of embodiment of a driving mechanism using shape memory alloys of the present invention, and FIG. 1 shows the configuration of a driving mechanism module in said driving mechanism, (a) is a plan view, and (b) is a cross-sectional view. In FIG. 1, a driving mechanism 20 using shape memory alloys has a plurality of driving mechanism modules 20a integrated therein. Each driving mechanism module 20a comprises a plurality of pairs of first and second shape memory alloys coils 1 and 2, a drive member 3, a fixing member 5, a magnetic latch part 9, and a substrate 4 provided with a common drive circuit 4a. Said drive member 3 is so selected that the pitch to the neighboring drive member 3 is, for example, 1.27 mm. Said substrate 4 is provided on its lower hem with a terminal 4b to connect to a connecting part in the driving mechanism 20. The substrate 4 is connected to a control part mentioned later via said terminal 4b. Said substrate 4 may be provided with a cover 14 surrounding the first shape memory alloys coil 1, the second shape memory alloys coil 2, the drive member 3 and the fixing member 4.

Said substrate 4 is a printed circuit board or the like, and has an opening part 12 through which the first shape memory alloys coil 1 and the second shape memory alloys coil 2 are inserted, and a wiring pattern 11 to supply electric current to said first shape memory alloys coil 1 and second shape memory alloys coil 2 and a wiring pattern (not shown) to connect the drive circuit are formed on its surface. Said first shape memory alloys coil 1 and second shape memory alloys coil 2, the drive member 3, and the fixing member 4 are held movably without contact with the substrate 4, about in parallel to the substrate 4. The upper first shape memory alloys coil 1 and the lower second shape memory alloys coil 2 are mutually connected in series. The drive member 3 is connected via the fixing member 5 to each of the first shape memory alloys coil 1 and the second shape memory alloys coil 2.

In said first shape memory alloys coil 1, the upper natural length part 1a and the lower extended part 1b are connected in series, and this series-connected part is the series-connected part 1c of the first shape memory alloys coil. Likewise, in said second shape memory alloys coil 2, the lower natural length part 2a and the upper extended part 2b are connected in series, and this series-connected part is the series-connected part 2c of the second shape memory alloys coil. The extended part 1b of said first shape memory alloys coil 1 and the extended part 2b of said second shape memory alloys coils 2 are mutually connected to make a common electrode 15. Said common electrode 15 is connected to a common electrode wiring pattern 11a on the substrate 4. One end of the natural length part 1a of said first shape memory alloys coil 1 is connected to a ground electrode wiring pattern 11b. One end of the natural length part 2a of said second shape memory alloys coil 2 is connected to a ground electrode wiring pattern 11c.

Therefore, by connecting the terminal of one end of the current source to the common electrode wiring pattern 11a, and by connecting the terminal of the other end of said current source to the ground electrode wiring pattern 11b or 11c, each of the first shape memory alloys coil 1 or the second shape memory alloys coil 2 can be supplied with electric current and heated. The electric current supply to the first shape memory alloys coil 1, the second shape memory alloys coil 2 can be selectively switched and controlled by said drive circuit 4a.

When the electric current is supplied to the upper first shape memory alloys coil 1, the extended part 1b of said first shape memory alloys coil 1 compresses by heating, and the drive member 3 moves downward. Also, when the electric current is supplied to the lower second shape memory alloys coil 2, the extended part 2b of said second shape memory alloys coil 2 compresses by heating, and the drive member 3 moves upward.

Said drive member 3 is made, for example, of a linear material such as a round bar and a square bar extending in the axis direction, in case of illustration (the vertical direction in FIG. 1), and is connected via the fixing member 5 to each of the first shape memory alloys coil 1 and the second shape memory alloys coil 2. Each drive member 3 is shaped as a pin 3a with its larger diameter upper end.

A magnetic latch part of the driving mechanism using shape memory alloys of the present invention will be explained.

FIG. 2 illustrates the configuration of a magnetic plate in a driving mechanism module using shape memory alloys of FIG. 1, and (a) is a partial perspective view, and (b) is a cross-sectional view along the direction A-A. As shown in FIG. 2, a magnetic latch part 9 includes a magnetic plate 9c arranged above the substrate 4, and two magnetic body tubes 9a and 9b. The magnetic plates 9c are provided commonly to each driving mechanism 20, and one each is provided to one or a plurality of properly divided driving mechanism. The magnetic plates 9c are held at the pre-determined interval to the substrate 4 by spacers 9d, as well as the drive member 3 of each driving mechanism is provided with a plurality of penetration holes 9e through which the drive member penetrates without contact. In case of illustration, it is magnetized in the vertical direction so the upper part becomes N pole and the lower part S pole (See the vertical arrow mark in FIG. 2(a)). Said magnetic plate 9c is provided on its upper part with an outer frame 9f of the height to surround the pin 3a of the drive member 3 moved downward. The fixing and holding strength in magnetic fixation of the drive member 3 by said magnetic latch part 9 is selected as smaller than that of the driving force of the first and the second shape memory alloys coils 1 and 2.

The magnetic body tubes 9a and 9b are attached to the drive member 3 separately in the axis direction in the region between the part extending upward from the upper hem of the substrate 4 of the drive member 3 and the tip of the drive member, that is, below the pin 3a. The magnetic body tubes 9a and 9b are made, for example, of iron, nickel, or others, and fixed to the drive member 3. Said magnetic latch part 9 is arranged above the substrate 4, and made independently of the substrate 4.

When the drive member 3 moves in the vertical direction, the magnetic body tubes 9a and 9b are magnetically fixed inside the corresponding penetration hole 9e provided to the magnet plate 9c, thereby they are fixed and held to the magnet plate 9c as the latch position. Hence, the drive member 3 is held at the latch position by the magnetic latch part 9 by displacement downward or upward by electric current to the first or the second shape memory alloys coil 1 or 2, respectively. Therefore, it is not necessary to keep flowing electric current to the first or the second shape memory alloys coil 1 or 2 for keeping displacement of the drive member 3.

In FIG. 1, the first and third from the left of the magnetic body tubes 9b in the drive members 3 are fixed and held at the latch position, and the second and fourth from the left of the magnetic body tubes 9a in the drive members 3 are fixed and held at the latch position. The magnet plate 9c of said magnetic latch part 9 is assembled with the spacer 9d and the outer frame 9f into one unit, and, upon maintenance and others of the driving mechanism 20, it is separable from the substrate 4.

The shape memory alloys used in the present invention will be explained. As shape memory alloys, Ti—Ni or Cu—Zn—Al alloy is commonly used. The shape memory alloys is such that thermal energy is converted to kinetic energy upon heating to extend or compress to the original shape. In order to make larger the amount of displacement of this case, it is more effective to use a coil shape than a linear shape.

Figure 3:
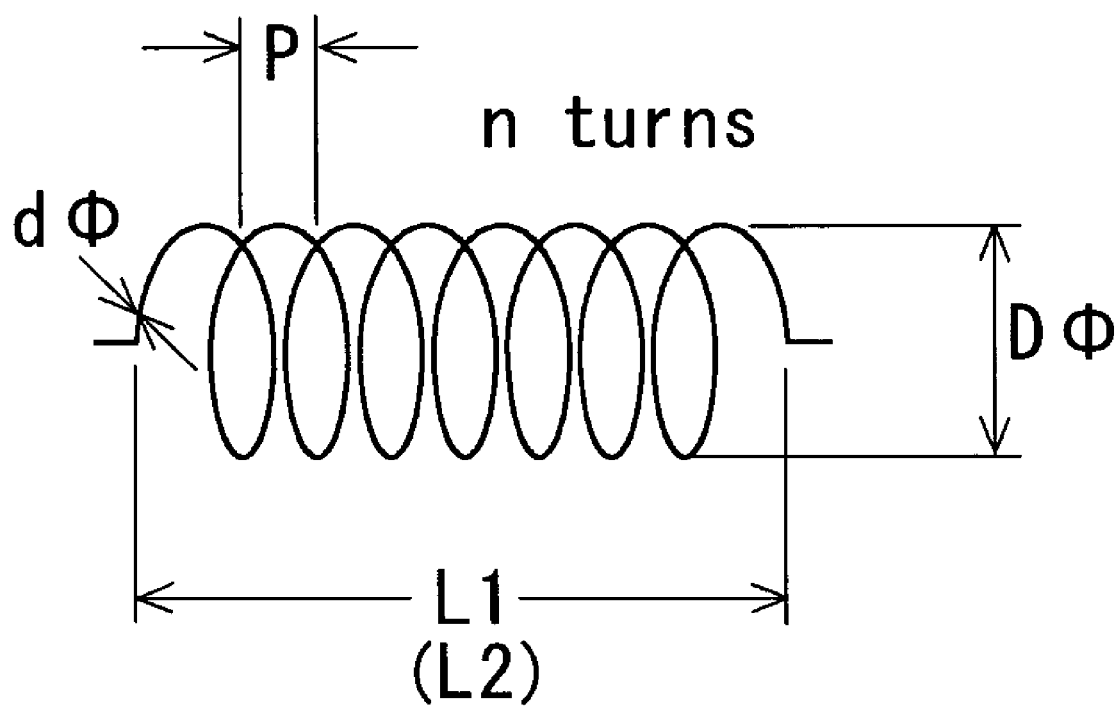
FIG. 3 is a view illustrating the shape and size of a shape memory alloys coil.

FIG. 3 is a view illustrating the shape and size of a shape memory alloys coil. The coil has a pitch P, an average diameter D, a wire diameter d, a winding number n, a natural length L1, and a extended part L2, respectively.

Here, the maximum value of the strain (%) as the displacement of the coil is expressed as the Equation (1).

$$\gamma_{max} = d\delta/nd^* (P^2 + (\pi D)^2)^{-1/2} * 100 (\%) \quad (1)$$

$\delta$ is a compressed quantity from the natural length of the shape memory alloys coil.

The generated force $F_a$ by heating of the shape memory alloys coil is expressed as the following Equation (2).

$$F_a = \pi d^{4*} (G_1 - G_0)/(8nD^2) * (P^2 + (\pi D)^2)^{-1/2} * \delta \quad (2)$$

$G_0$ and $G_1$ are horizontal elastic coefficients at room temperature and the heated state (for example, 140° C.), respectively.

The life by repetition of a shape memory alloys coil is determined by the strain generated in the coil. The life by repetition of a coil is about $10^6$ repetitions for the strain level of 1%, and about $10^5$ repetitions for the strain level 2%. Therefore, the shape of the shape memory alloys coil may be calculated to obtain its strain, that is, the displacement and the generated force taking into considerations the given equations etc shown above and the life by repetition.

The driving mechanism using shape memory alloys as the first form of embodiment of the present invention operates as follows.

Figure 4:
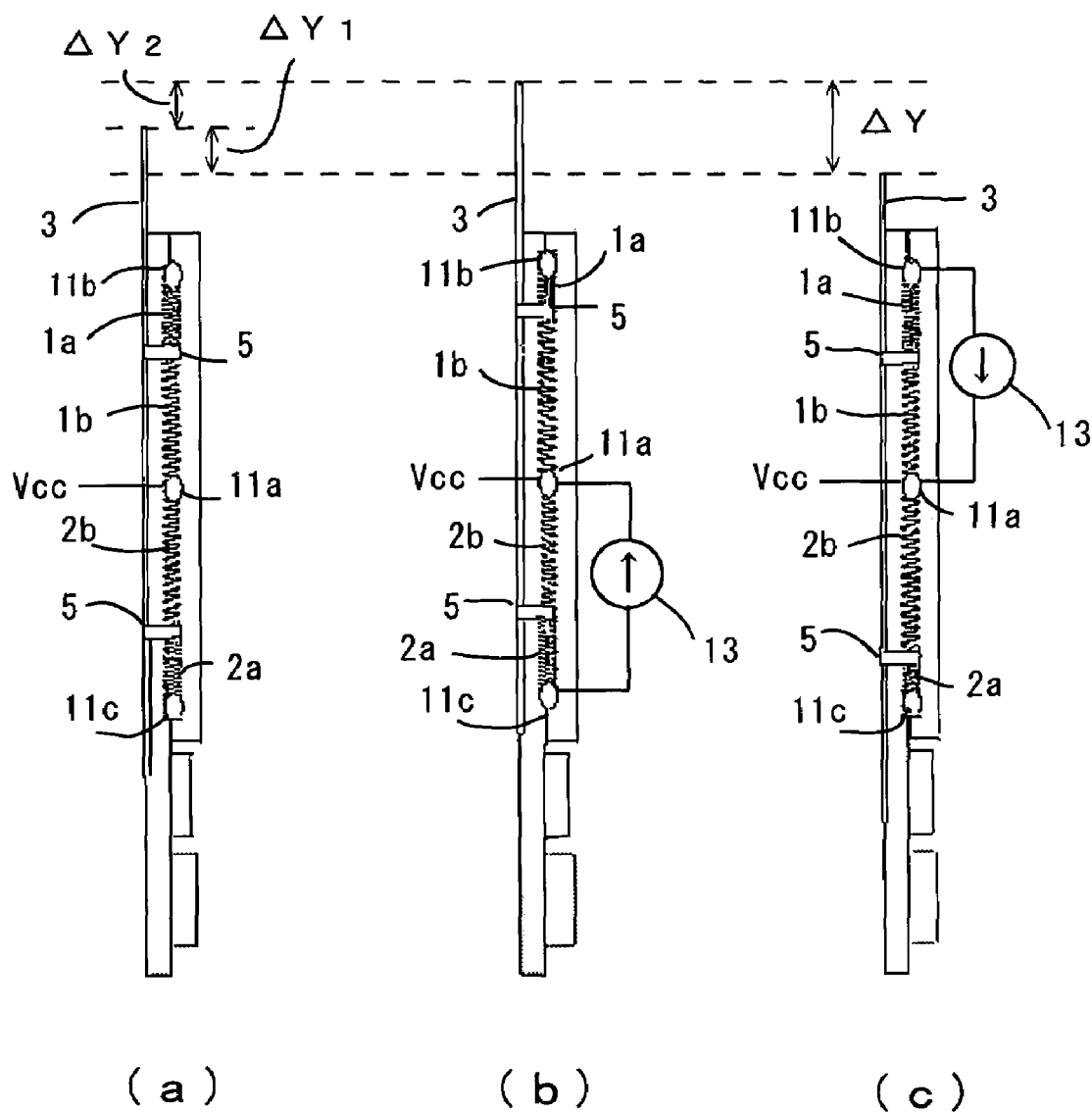

FIG. 4 is a view illustrating the operation of the driving mechanism using shape memory alloys as the first form of embodiment, and (a) shows the unheated state, (b) shows the shape memory alloys coil 2 with electric current turned on, and (c) shows the shape memory alloys coil 1 with electric current turned on, and a latch part is not shown. As shown in FIG. 4(b), in the second shape memory alloys coil 2, the plus terminal of a current source 13 is connected to the common power source wiring pattern 11a, and the minus terminal is connected to the ground electrode pattern 11c, and the second shape memory alloys coil 2 is applied with electric current to generate heat, that is the Joule heat, by its resistance and the flowing current. By said heat generation, since the extended part 2b which is extended longer than the natural length of the second shape memory alloys coil 2 compresses, and the natural length part 2a is extended, the drive member 3 connected to the fixing member 5 fixing the shape memory alloys coil compresses, thereby moves upward of the paper plane. When the electric current is turned off, the drive member 3 holds its position by the latch part 9 (FIG. 1).

Next, in FIG. 4(c), when the minus terminal of the current source 13 is switched to the ground electrode wiring pattern 11b while connecting the plus terminal of the current source 13 and the common power source wiring pattern 11a, the first shape memory alloys coil 1 is heated. By said heat generation, since the extended part 1b which is extended longer than the natural length of the first shape memory alloys coil 1 compresses, and the natural length part 1a is extended, the drive member 3 connected to the fixing member 5 fixing the shape memory alloys coil compresses, thereby moves downward of the paper plane. When the electric current is turned off, the drive member 3 holds its position by the latch part 9 (FIG. 1).

Since the plus terminal of the current source 13 is all the time connected to the common power electrode wiring pattern 11a, the drive member 3 moves up and down by switching the minus terminal of the current source 13 to the ground electrode wiring pattern 11b or 11c, and as illustrated in the figure, the movement $\Delta Y$ which is displacement is caused. In case that the displacement $\Delta Y$ is occurred, it can be used for the two value digital display by applying the difference of $\Delta Y$ to 0 or 1. In the state between non current flow and in the state where the current flows in the first shape memory alloys coil 1, the displacement difference $\Delta Y1$ is generated, and in the state where the current flows in the second shape memory alloys coil, the displacement difference $\Delta Y2$ is generated.

In the driving mechanism 20 using shape memory alloys of the first form of embodiment of the present invention, the drive member 3 is provided with magnetic body tubes 9a and 9b, and since the displacement caused when the pulsed electric current flows in each of shape memory alloys coils 1 and 2 is immediately latched, the current to maintain said displacement becomes unnecessary. Thereby, the power consumption to give the displacement to the drive member 3 of the driving mechanism 20 using shape memory alloys can be remarkably reduced.

In the explanation described above, the case was explained where there were two magnetic body tubes 9a and 9b, and the displacement had two values, that is, two steps case. In order to make the displacement of the drive member to further multi-levels, the number of the latched magnetic body tubes may be increased depending upon the displacement steps. In order to attain the multi-levels displacement of the shape memory alloys coil, the current flow amounts to them may be changed. Thus, the displacement can be adjusted by adjusting the lengths and others of the drive member and the shape memory alloys coils, the desired operation displacement can be attained, and said operation displacement can be easily made larger.

By rotating the driving mechanism 20 using shape memory alloys as shown in FIG. 4 by 90°, the displacements in the left and right directions on a paper plane can be obtained as those of the drive member 3. The arrangement of said driving mechanism 20 using shape memory alloys may be changed according to its purpose of application.

As mentioned above, the case was explained where the drive member 3 moves by the extending parts 1b and 2b of the first or the second shape memory alloys coil heated and shrunk, but the configuration may be with the extending parts 1b and 2b of said first and second shape memory alloys coils as the compressed parts compressed from natural lengths. In this case, the drive member 3 can be moved by that the compressed part of the first or the second shape memory alloys coil is heated and extended.

Since in the driving mechanism 20 using shape memory alloys in accordance with the first form of embodiment of the present invention, the first or the second shape memory alloys coils 1 and 2 and a drive member 3 are arranged on the substrate 4 plane, compared with the conventional pin drive device using shape memory alloys in Patent Reference 3, the driving mechanism can be made of one plate of substrate, resulting in less number of parts and hence easy assembly.

Since each member of the driving mechanism 20 of the shape memory alloys coil can be made on the substrate 4, the diameters of shape memory alloys coils 1 and 2 can be made smaller, and since the resistances of shape memory alloys coils 1 and 2 are higher inversely proportional to the cross-sectional area, the electric current required for heating is reduced. Since the diameters of shape memory alloys coils 1 and 2 can be reduced compared with that of the conventional example of Patent Reference 3, the heat capacities of shape memory alloys coils 1 and 2 are reduced resulting in a shorter heating time, and, at the same time, since the ratio of volume and surface area (volume/surface area) of shape memory alloys coils 1 and 2 is reduced, the heat by the electric current heating stored in the shape memory alloys coils 1 and 2 can be rapidly dissipated to the ambient atmosphere.

Therefore, compared with the conventional pin driving mechanism using shape memory alloys coil, the present invention can make a small device in size, make operation displacement larger, can drive at high speed with less power, and can manufacture at lower cost.

The second form of embodiment of the driving mechanism using shape memory alloys of the present invention will be explained.

Figure 5:
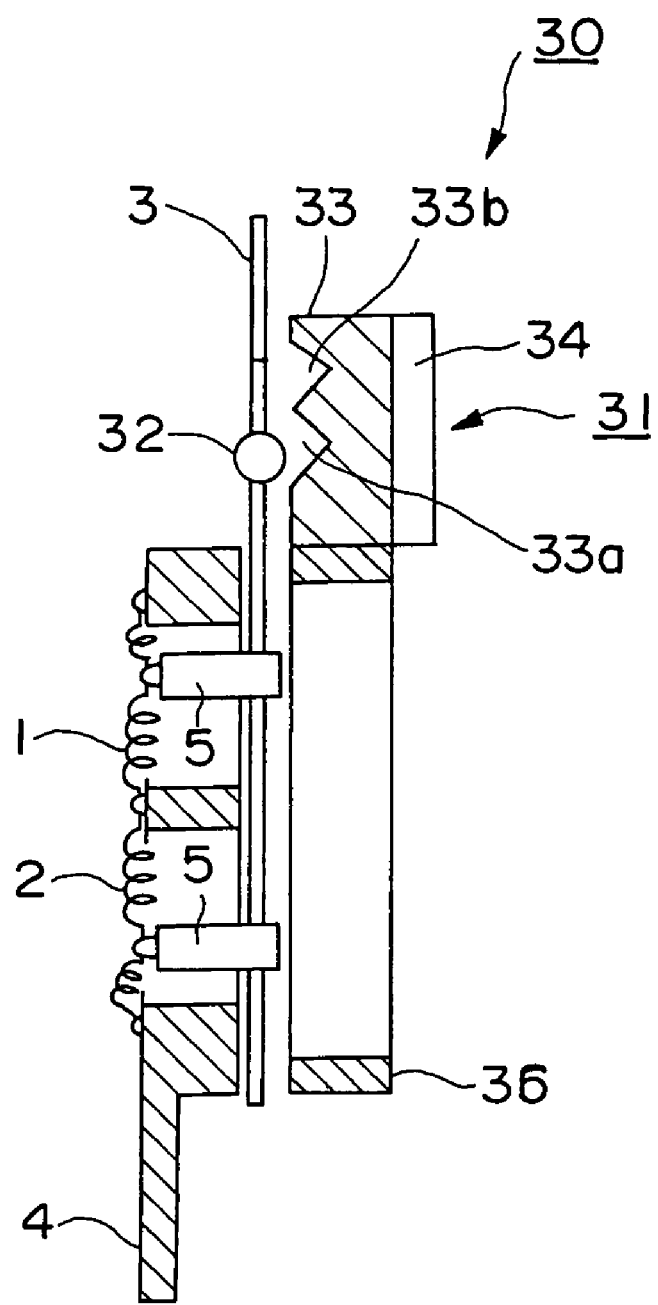
FIG. 5 is a view illustrating the configuration of the second form of embodiment of the driving mechanism using shape memory alloys of the present invention.

FIG. 5 is a view illustrating the configuration of the second form of embodiment of a driving mechanism using shape memory alloys of the present invention. In FIG. 5, a driving mechanism 30 using shape memory alloys has basically the same structure as the driving mechanism module 20a as shown in FIG. 1, but the only difference is being provided with a magnetic latch part 31 instead of the magnetic latch part 9.

The magnetic latch part 31 is made in the extending part upward form the upper hem of the substrate 4 of said drive member 3 with one or a plurality of magnetic body tubes 32 attached to the drive member 3 and two concave parts 33a and 33b mutually arranged separately in the axis direction facing the displacement region of said magnetic body tubes 32. Said magnetic body tubes 32 are formed as about cylindrically extending shape in the direction perpendicular to the paper face in FIG. 5, and are fixed to the drive member 3. Said latch member 33 is provided with a magnet 34 on the opposite face where said concave parts 33a and 33b are provided. When the substrate 4 has a cover 36, said latch member 33 is connected to the upper end of said cover 36, or may be integrated with the cover 36. The latch member 33 itself may be made of a magnet instead of using the magnet 34.

In said driving mechanism 30 using shape memory alloys, when the drive member 3 moves downward with the electric current supplied to the second shape memory alloys coil 2, the magnetic body tube 32 will move to the position facing the first concave part 33a of the latch member 33. Therefore, the magnetic body tube 32 is magnetically fixed inside the first concave part 33a by magnetism of the magnet 34 on its backside, and fixed and held in axis direction. On the other hand, when the first shape memory alloys coil 1 is supplied with the electric current and the drive member 3 moves upward, the magnetic body tube 32 attached to the drive member 3 moves to the position facing the second concave part 33b of the latch member 33. Therefore, the magnetic body tube 32 is magnetically fixed inside the second concave part 33b by magnetism of the magnet 34 on its backside, and fixed and held in axis direction.

The third form of embodiment of the driving mechanism using shape memory alloys of the present invention will be explained.

Figure 6:
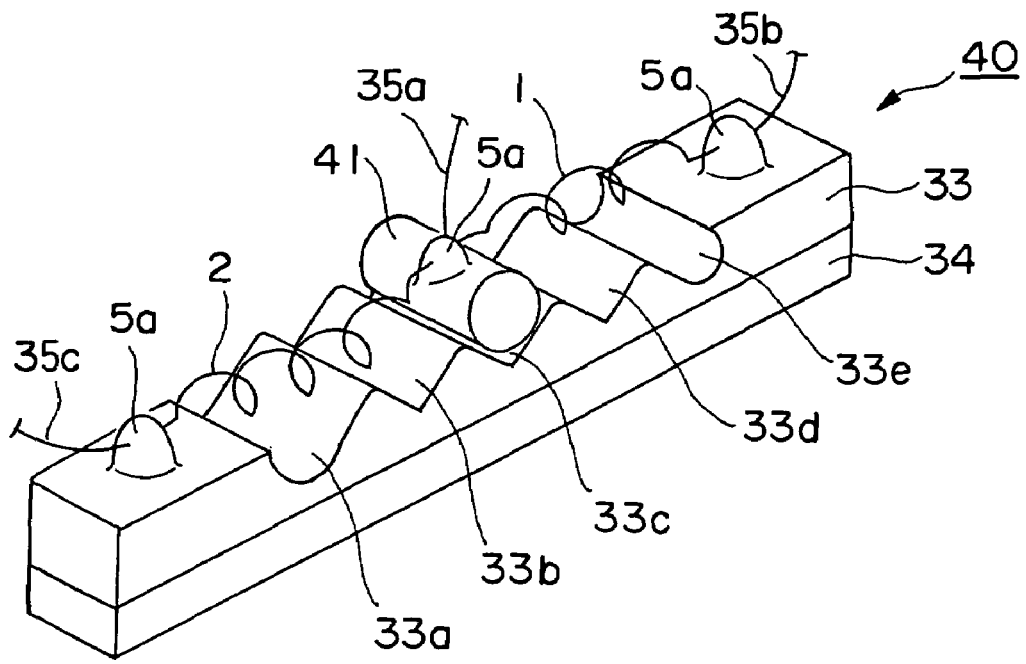
FIG. 6 is a view illustrating the configuration of the main part of the third form of embodiment of the driving mechanism using shape memory alloys of the present invention.

In FIG. 6, a driving mechanism 40 using shape memory alloys is provided with a rod 41 made of a magnetic material instead of the drive member 3 and the magnetic body tube 32 in the driving mechanism 30 shown in FIG. 5. It has a different configuration in that said rod 41 is attached directly to the connection part of the first and the second shape memory alloys coils 1 and 2 with a fixing part 5a of solder or the like not via the fixing member 5, as well as the latch member 33 of the magnetic latch part 31 is provided with five concave parts 33a, 33b, 33c, 33d, and 33e. In this case, the rod 41 constitutes a drive member. Lead wires 35a, 35b, and 35c to supply power to respective shape memory alloys coils are connected to the fixing part 5a of the rod 41, the fixing part 5a of the first shape memory alloys coil 1, and the fixing part 5a of the second shape memory alloys coil. Hereinafter the longitudinal direction of the first and the second shape memory alloys coils 1 and 2 are to be called the axis direction.

The first shape memory alloys coil 1 comprises a extended part or a compressed part, the second shape memory alloys coil 2 also comprises likewise a extended part or a compressed part, and each end of the extended or the compressed parts of said first and second shape memory alloys coils is mutually connected in series. The extended or the compressed parts of the first shape memory alloys coil 1 and the extended or the compressed parts of the second shape memory alloys coil 2 are connected in series. The series-connected part of one end of the extended or the compressed parts of the first shape memory alloys coil 1 and one end of the extended or the compressed parts of the second shape memory alloys coil 2 is connected to the rod 41 via the fixing part 5a to be a common electrode, and it is connected to the lead wire 35a.

Further, both ends of the first and the second shape memory alloys coils 1 and 2 to be connected in series, that is, each other end of the extended or the compressed parts of the first and the second shape memory alloys coils 1 are connected by a fixing part 5a of solder or the like on the upper face of both ends where the concave parts 33a to 33e of the latch part 33 are not provided. At each other end of the first and the second shape memory alloys coils 1 and 2, lead wires 35b and 35c are connected respectively to be ground electrodes. As an example of the size of a concave part, the groove width is about 2 mm, and the groove depth is about 1 mm. The diameter of the rod 41 may be about 1 to 2 mm.

By said driving mechanism 40, the first and the second shape memory alloys coils are heated by selectively driving the current, the heated first or second shape memory alloys coils is shrunk or extended so that the rod 41 is moved along a plurality of concave parts 33a to 33e of the latch member 33, that is, in axis direction, and can be fixed and held by magnetic fixation to the latch part 31. Since the displacement in axis direction can be adjusted by adjusting the size and number of concave parts and the lengths of shape memory alloys coils, the desired displacement of moving can be attained, and large of said displacement of moving can be made easily. Therefore, by selective current supply and amounts of current to the first and the second shape memory alloys coils 1 and 2, the rod 41 can be moved at multi-steps in the direction of the concave parts 33a to 33e. Said rod 41 is magnetically fixed by the magnetism of the magnet 34 in either one of the concave parts 33a to 33e facing the moved position of the rod 41, and is fixed and held inside the concave part. The rod 41 is selectively fixed and held inside five concave parts 33a to 33e along the direction of concave parts, acts as a multi-step actuator, and the displacement of moving can be made larger.

Figure 7:
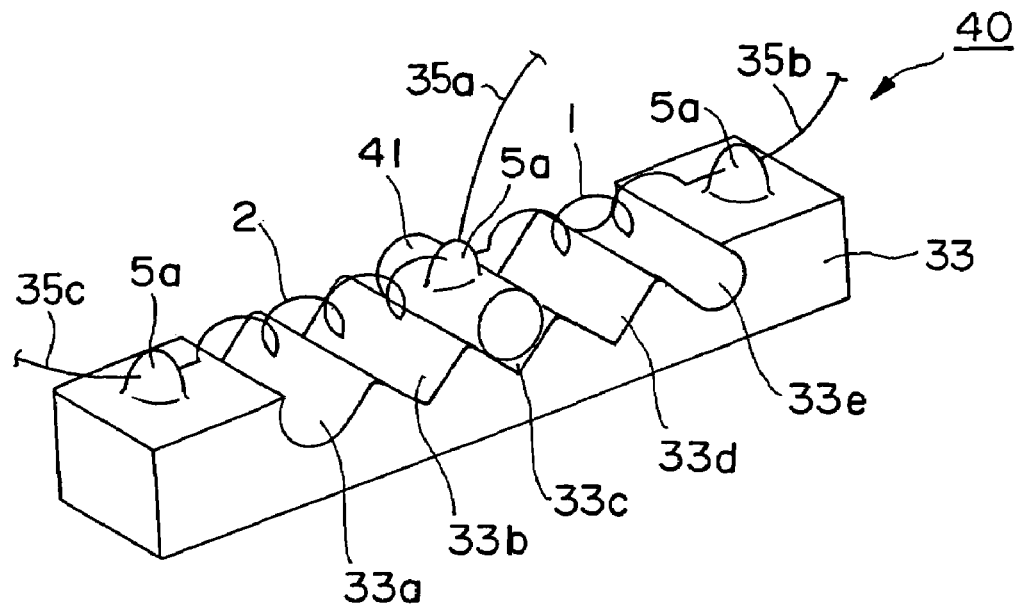
FIG. 7 is a diagrammatical perspective view illustrating the configuration of a modified example of the third form of embodiment of the driving mechanism using shape memory alloys of the present invention.

FIG. 7 is a diagrammatical perspective view illustrating the configuration of a modified example of the third form of embodiment of the driving mechanism using shape memory alloys of the present invention. The latch member 33 itself may be made of a magnet.

Figure 8:
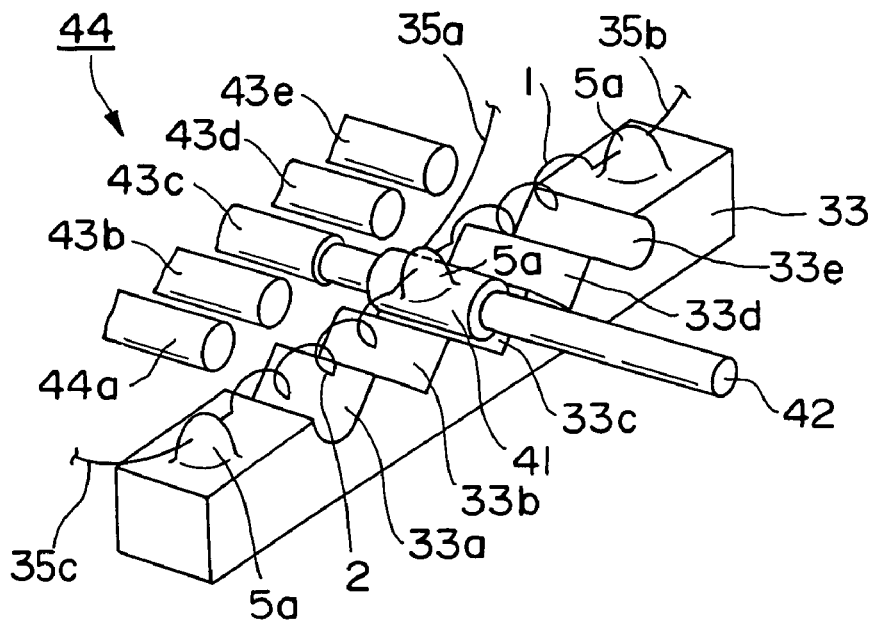
FIG. 8 is a diagrammatical perspective view illustrating the configuration of an optical fiber switch as an optical device utilizing the driving mechanism using shape memory alloys shown in FIG. 7.

FIG. 8 is a diagrammatical perspective view illustrating a configuration example of an optical fiber switch 44 as an optical device equipped with a driving mechanism 40 using the shape memory alloy as shown in FIG. 7. As shown in FIG. 8, by forming the rod 41 as a hollow cylinder, and by holding one end of an optical fiber 42, the optical fiber switch 45 can be assembled in which each one end of other respective optical fibers 43a to 43e is arranged at the position facing each concave part 33a to 33e of a latch member 33. The rod 41 is moved at multi-steps in the direction of the concave parts 33a to 33e by selective current supply and amounts of current to the first and the second shape memory alloys coils 1 and 2, and is fixed and held inside any of the concave parts 33a to 33e, then one end of the optical fiber 42 held by the rod 41, facing any terminal part of other optical fibers 43a to 43e, is optically connected.

Figure 9:
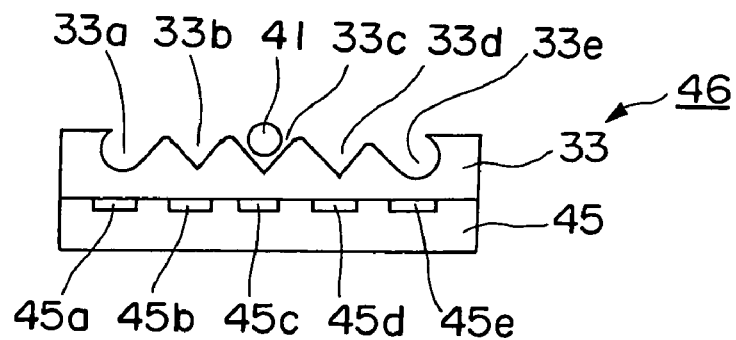
FIG. 9 is a cross-sectional view of main parts of a modified example of the optical fiber switch shown in FIG. 8.

FIG. 9 is a cross-sectional view of main parts of a modified example of the driving mechanism 40 using shape memory alloys as shown in FIG. 7, and the optical fiber switch 44 as shown in FIG. 8. As shown in FIG. 9, in a driving mechanism 46 using shape memory alloys, each of magnetic sensors 45a to 45e may correspond to said each of concave parts 33a to 33e by arranging a magnetic sensor array 45 opposite to the concave parts 33a to 33e of the latch member 33. The magnetic sensors 45a to 45e corresponding to the concave parts 33a to 33e where the rod 41 is fixed and held can detect said rod 41, and to which concave parts 33a to 33e the rod 41 is switched. Also, since this driving mechanism 46 using shape memory alloys can detect the position of the concave part, that is, the latch position with the magnetic sensor array 45 by setting the position of a concave part of the rod 41 by human finger to an arbitrary position, it can be used as a sensor of the latch position. This can be used as the pointing device by setting the position of a concave part of the rod 41.

Figure 10:
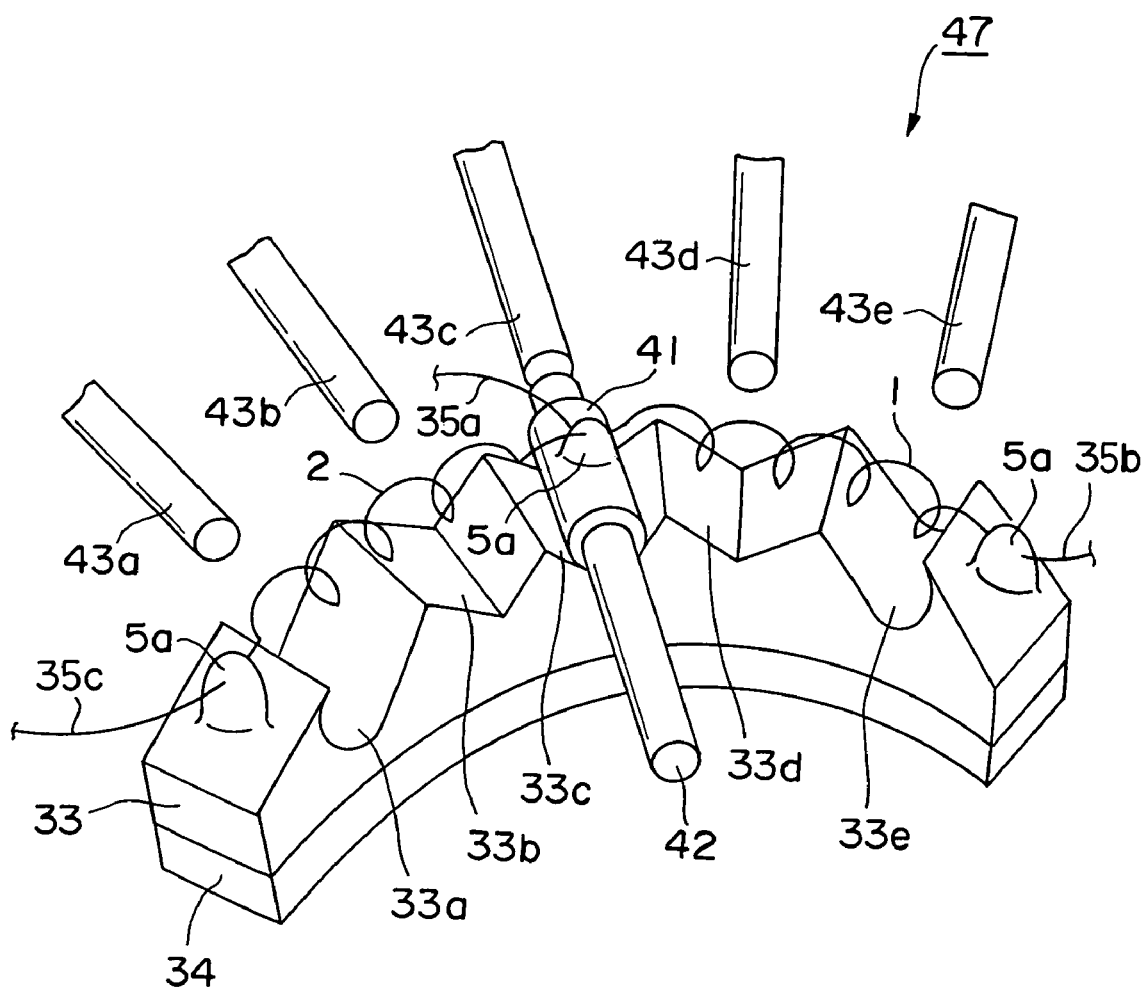
FIG. 10 is a perspective view of a modified example of the optical fiber switch shown in FIG. 8.

FIG. 10 illustrates a modified example of the optical fiber switch as shown in FIG. 8. In FIG. 10, an optical fiber switch 47 has approximately same configuration as the optical fiber switch 44 as shown in FIG. 8, and differs only in that it bends as a whole to form a flabellate shape. Responding to it, the optical fibers 43a to 43e are also arranged in a flabellate shape, and their optical axis is arranged radially at the end parts facing the concave parts 33a to 33e. The optical fiber switch 47 acts similarly to the optical fiber switch 44 as shown in FIG. 8, as well as one end of optical fiber 42 held by the rod 41 moves on the circular arc by the displacement of the rod 41. Thereby, the spacing of the end faces of the facing optical fiber can be maintained constant, and the transmitted optical intensity can also be maintained constant.

Figure 11:
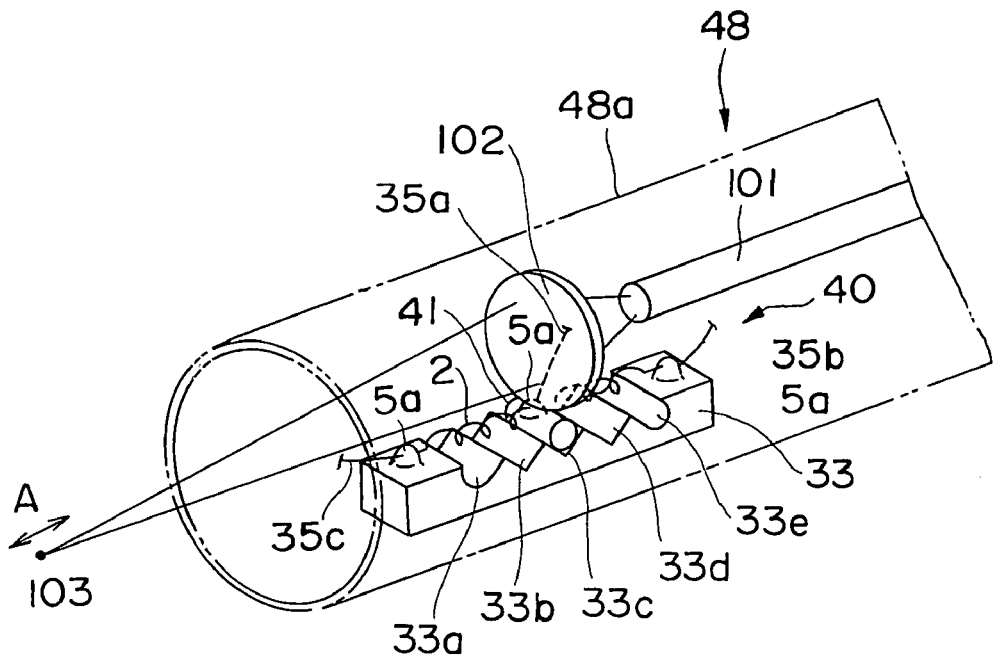
FIG. 11 is a diagrammatical diagonal perspective view illustrating the configuration of an endoscope 48 having a focus adjusting mechanism as an optical device provided with the driving mechanism 40 using shape memory alloys shown in FIG. 7.

FIG. 11 is a diagrammatical diagonal perspective view illustrating an endoscope 48 having a focus adjusting mechanism as an optical device utilizing the driving mechanism 40 as shown in FIG. 7. An optical fiber 101 and a lens 102 introducing the light from a light source such as a light emitting diode (LED, not shown) are provided at the tip part 48a of the endoscope, and said lens 102 is driven by the driving mechanism 40 using shape memory alloys. The lens 102 is firmly fixed to the rod 41 made of a magnetic body of the driving mechanism 40 using shape memory alloys with an adhesive or others. Although the illustrated lens 102 is a convex/convex lens, it may be either flat/convex, cylindrical, or spherical in shape.

The position of the lens 102 held by the rod 41 changes when the rod 41 is moved at multi-steps in the direction of the concave parts 33a to 33e by selective current supply and amounts of current to the first and the second shape memory alloys coils 1 and 2, and fixed and held inside any of the concave parts 33a to 33e. Therefore, the focal position 103 of the light emitted from the optical fiber by the lens 102 held by the driving mechanism 40 using shape memory alloys changes (See the arrow mark A of FIG. 11), and the lens 102 held by the driving mechanism 40 using shape memory alloys acts as a focus adjusting mechanism. Although the five concave parts as 33a to 33e are illustrated in this case, the number of concave parts and their intervals may be properly designed so that a desired focus adjustment can be attained. An accurate focus adjusting mechanism with low power consumption can be realized by using the driving mechanism 40 made of shape memory alloys.

Figure 12:
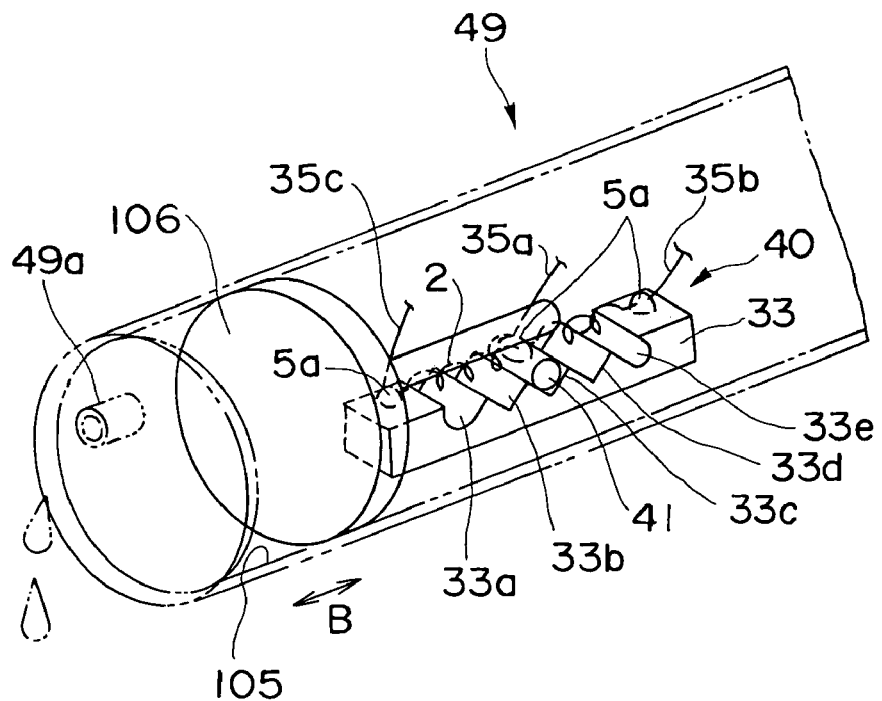
FIG. 12 is a diagrammatical diagonal perspective view illustrating the configuration of a liquid injector equipped with the driving mechanism using shape memory alloys shown in FIG. 7.

FIG. 12 is a diagrammatical diagonal perspective view illustrating a configuration example of a liquid injector 49 equipping the driving mechanism 40 shown in FIG. 7. As shown in FIG. 12, the liquid injector comprises a liquid room 105 and a syringe 106. The axis of the syringe 106 is driven by the driving mechanism 40 with shape memory alloys. The axis of the syringe 106 is firmly fixed with an adhesive or others to the rod 41 made of a magnetic body of the driving mechanism 40 using shape memory alloys. The position of the syringe 106 driven by the rod 41 changes (See the arrow mark B of FIG. 12), when the rod 41 is moved at multi-steps in the direction of the concave parts 33a to 33e by selective current supply and amounts of current to the first and the second shape memory alloys coils 1 and 2, and fixed and held inside any of the concave parts 33a to 33e.

When the syringe 106 driven by the driving mechanism 40 using shape memory alloys moves to the left as shown by an arrow mark B, the liquid in the liquid room 105 is injected outside through an aperture part 49a. On the other hand, when the syringe 106 moves to the right as showing by the arrow mark B, the liquid outside of the liquid room 105 can be sucked into the liquid room 105 via the aperture part 49a. Although the five concave parts as 33a to 33e are illustrated in this case, the number of concave parts and their intervals may be properly designed so that a desired liquid injection or sucking can be attained. Since said liquid injector 49 is such that the position of the syringe 106 is fixed by the latch mechanism of the driving mechanism 40 using shape memory alloys, the shape memory alloys may be driven only when liquid injection is required. An accurate liquid injector 49 with low power consumption can be realized by using the driving mechanism 40 having shape memory alloys. Said liquid injector 49 can be used, for example, as a medicine injector if the liquid inside the liquid room 105 is a medicine. For example, a medicine of the pre-determined quantity can be precisely injected into the sick part by burying the medicine injector in the sick part of the body, and driving the driving mechanism 40 using shape memory alloys as necessary.

An fourth form of embodiment of the driving mechanism using shape memory alloys of the present invention will be explained.

Figure 13:
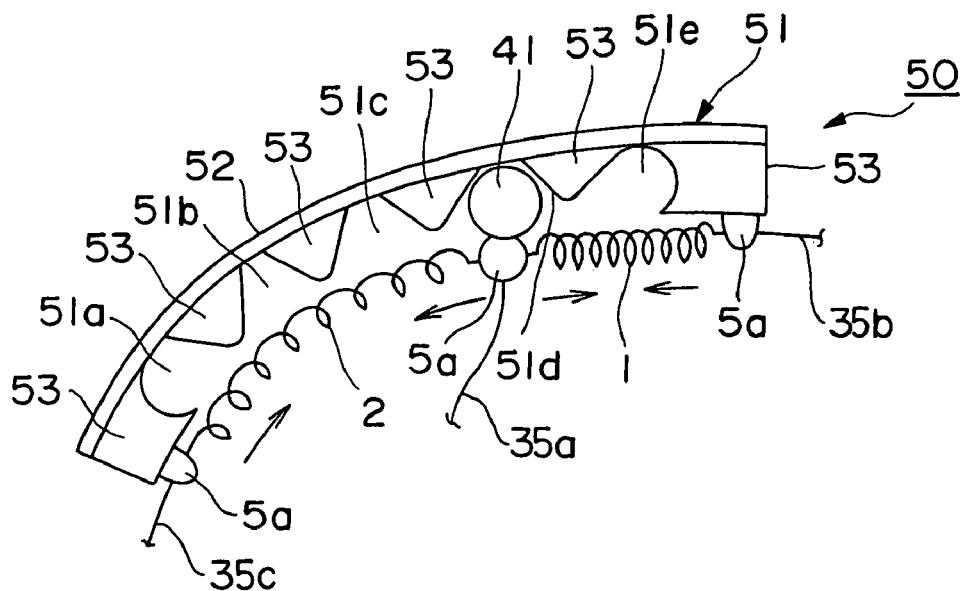
FIG. 13 is a view illustrating the configuration of the main part of the fourth form of embodiment of the driving mechanism using shape memory alloys of the present invention.

FIG. 13 illustrates the configuration of the main part of a fourth form of embodiment of a driving mechanism using shape memory alloys of the present invention. In FIG. 13, a driving mechanism 50 using shape memory alloys has basically the same configuration as the driving mechanism 40 using shape memory alloys as shown in FIG. 6, but differs in that it is provided with a latch member 51 instead of the latch member 33. Said latch member 51 comprises a flexible sheet 52 made of a flexible material and a magnetic latch part 53 made of a magnetic material or a magnet formed on said flexible sheet 52, and five concave parts 51a to 51e are arranged between each magnetic latch part 53. Responding to this, the rod 41 is made of a magnet or a magnetic material. By selective current supply and amounts of current to the first and the second shape memory alloys coils 1 and 2, the rod 41 is moved in the direction of the concave parts 51a to 51e, then said rod 41 is magnetically fixed by the magnetism of the magnetic latch part 53 or the rod 41 inside either one of the concave parts 51a to 51e corresponding to its moved position, and is fixed and held in either of said concave parts. The rod 41 is selectively fixed and held inside the five concave parts 51a to 51e, and it acts as a multi-step actuator.

Figure 14:
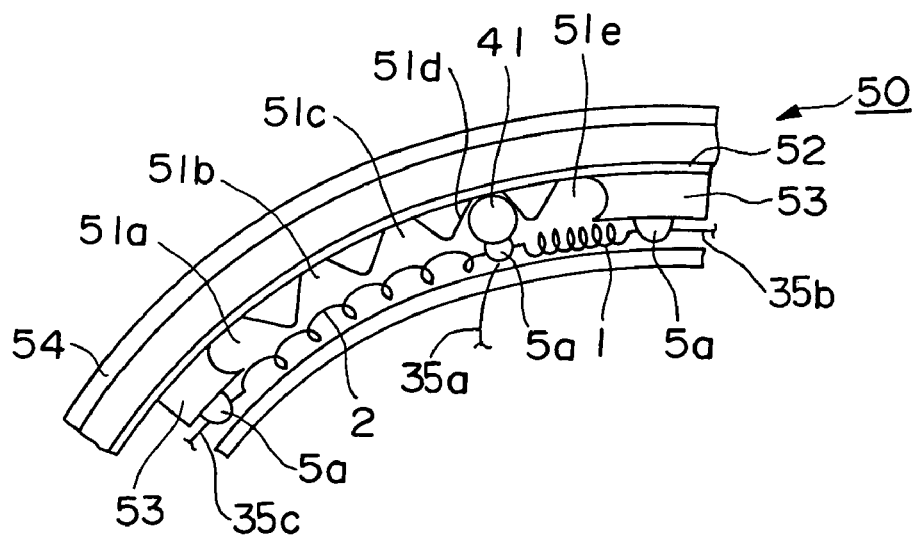
FIG. 14 is a diagrammatical side elevation view illustrating the configuration of a catheter bending mechanism manufactured by utilizing the driving mechanism using shape memory alloys shown in FIG. 13.

FIG. 14 is a diagrammatical side elevation view illustrating a configuration example of a catheter bending mechanism utilizing the driving mechanism as shown in FIG. 13. As shown in FIG. 14, said driving mechanism 50 using shape memory alloys can be attached along the vicinity of the tip of a catheter 54, and the rod 41 can be connected to the movable part of the bending mechanism (not shown in the figure) of the catheter 54. By moving said movable part utilizing the bending mechanism of the catheter 54, the bending state of the catheter 54 can be adjusted upon bending the vicinity of the tip of the catheter 54 by the action of the driving mechanism 50 using shape memory alloys, based on either one of the positions of the concave parts 51a to 51e where the rod 41 is fixed and held.

Although, in the forms of embodiments described above, the optical fiber switches 44 and 47, the focus adjusting mechanism 48, the liquid injector 49, and the catheter 54 were explained as the actuator utilizing the driving mechanism 40 or 50 of the present invention, the driving mechanism of the present invention can be applied as an actuator for various devices, not only as said optical devices or catheters. In any case, since it has multi-steps and large motion displacement, it can be integrated as compact and high density by using for the driving mechanism using high density shape memory alloys. The object for driving may be anything, for example, driving of a number of mirrors arranged in high density can be performed. In this case, a matrix type optical switch capable of selective drive of a number of mirrors can be realized.

Although, in the forms of embodiments described above, the latch positions of the drive member 3 or the rod 41 are designed as two, three, or five, it is obvious that four or more than six latch positions may do as well. Although magnetic latch parts 9 and 31 are constituted from the combination of magnetic body tubes 9a and 9b and magnet plate 9c, or the combination of a magnetic body tube 32 and a latch member 33 provided with the concave part, other constitution of a magnetic latch part may do as well so far as is provided with a plurality of latch position.

Figure 15:
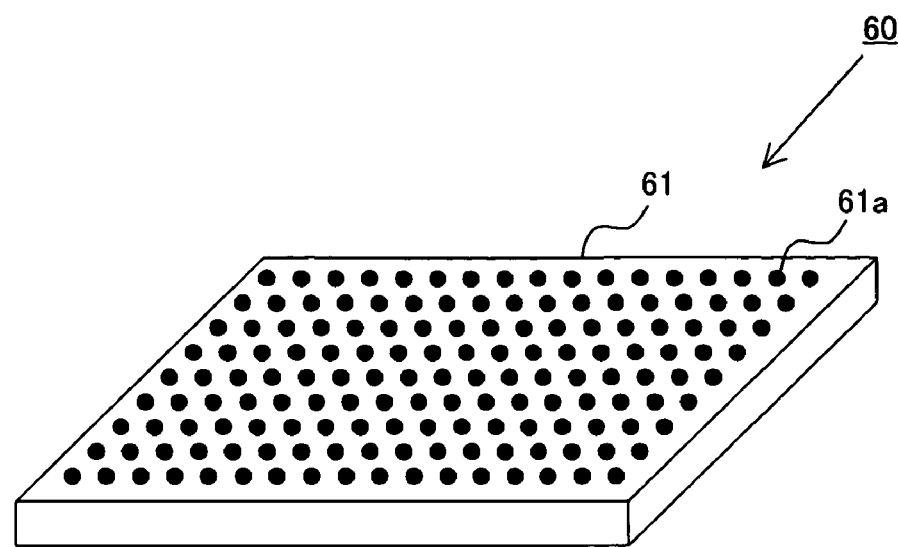
FIG. 15 is a perspective view diagrammatically illustrating the configuration of a display device using shape memory alloys as the second form of embodiment of the present invention.
Figure 15:
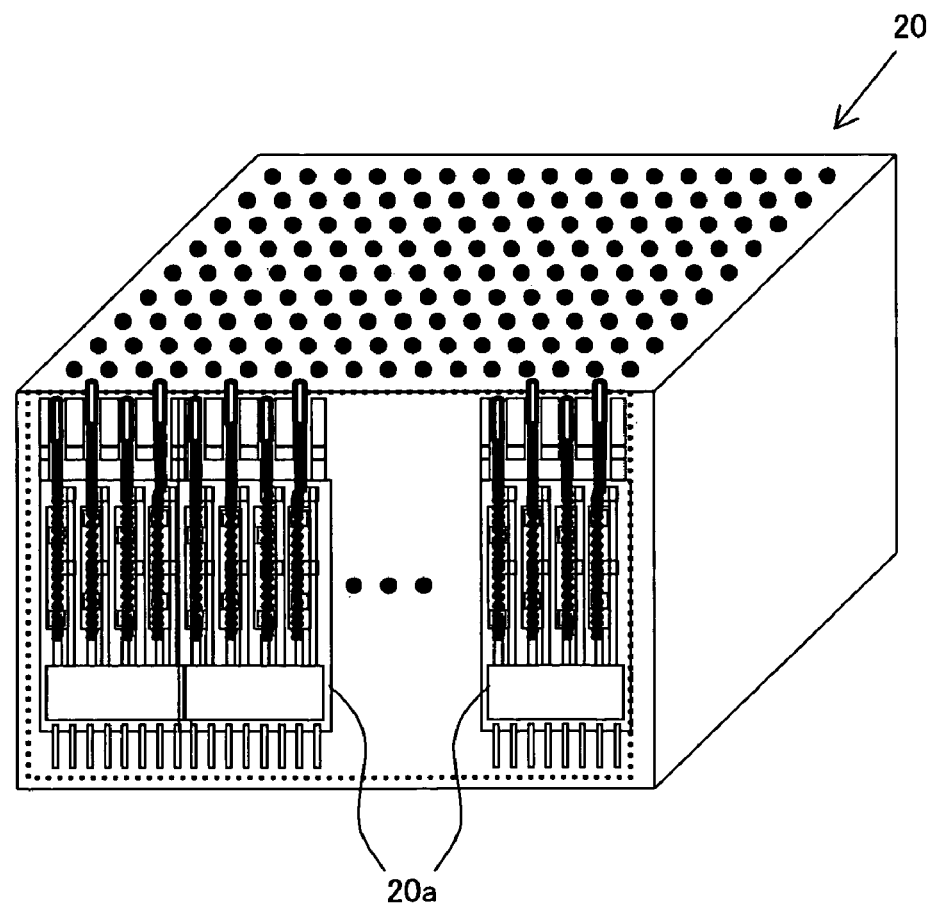

A display device using shape memory alloys in accordance with the second form of embodiment of the present invention will be explained. FIG. 15 is a perspective view diagrammatically illustrating the configuration of a display device using shape memory alloys as the second form of embodiment of the present invention. Said display device 60 comprises the driving mechanism using shape memory alloys 20, a display sheet 61 arranged thereon, and a control part 62 not shown in the figure and described below. Said display sheet 61 is located on the upper surface of a magnet plate 9c above a substrate 4, and has the penetration holes 61a corresponding to each penetration hole 9e of the magnet plate 9c. The penetration holes 61a through which pins 3a at the upper end of a drive member 3 of each driving mechanism selectively protrude on the two dimensional plane are arranged on the surface of the display sheet 61, that is, in dot matrix.

Figure 16:
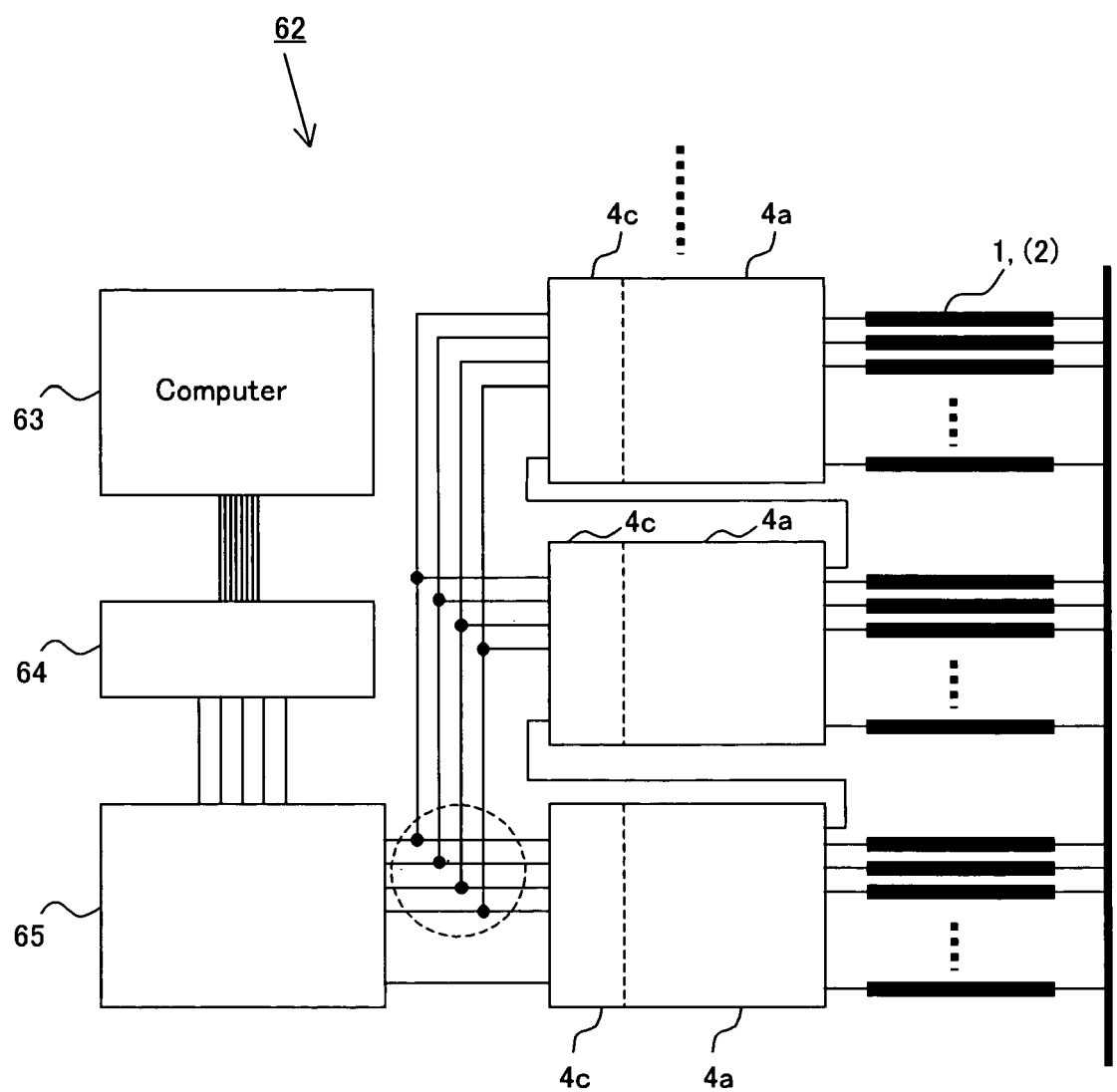
FIG. 16 is a block diagram illustrating the electric circuit configuration of a control part of the display device using shape memory alloys of the present invention shown in FIG. 15 and a drive circuit of each driving mechanism module.

FIG. 16 is a block diagram illustrating the electric circuit configuration of a control part of the display device using shape memory alloys of the present invention shown in FIG. 15 and a drive circuit of each driving mechanism module. Said control part 62 comprises a computer 63 such as a personal computer and a control CPU 65 controlled by said computer 63 via, for example, an interface 64 such as USB, and it drives to control the drive circuit 4a of each drive circuit module 20a. The display data is made by the computer 63 and it is output to the control CPU 65 via the interface 64, the control CPU 65 generates serial data based on said display data for drive-control of the first or the second shape memory alloys coil 1 or 2 in each driving mechanism module 20a of the driving mechanism 20, and also generates control signals for each shift resistor 4c.

The control CPU 65 outputs control signals to the shift resistor 4c of each drive circuit 4a, as well as serial data to the first drive circuit 4a. Said serial data is output sequentially to the shift resistor 4c of each drive circuit 4a with the shift resistor 4c of each drive circuit 4a mutually so-called cascade connected. Therefore, the wiring between the control CPU 65 and the drive circuit 4 may be few in number because only a control signal line for a shift resistor 4c and one serial data signal line are enough. Although each drive member 3 is arranged, for example, at 1.27 mm pitch, 2.5 mm pitch Braille display may do by selectively moving each other drive member 3 in case of Braille display, and it may be a so-called tactile display device.

The display device using shape memory alloys 60 in accordance with the second form of embodiment of the present invention operates as below.

Figure 17:
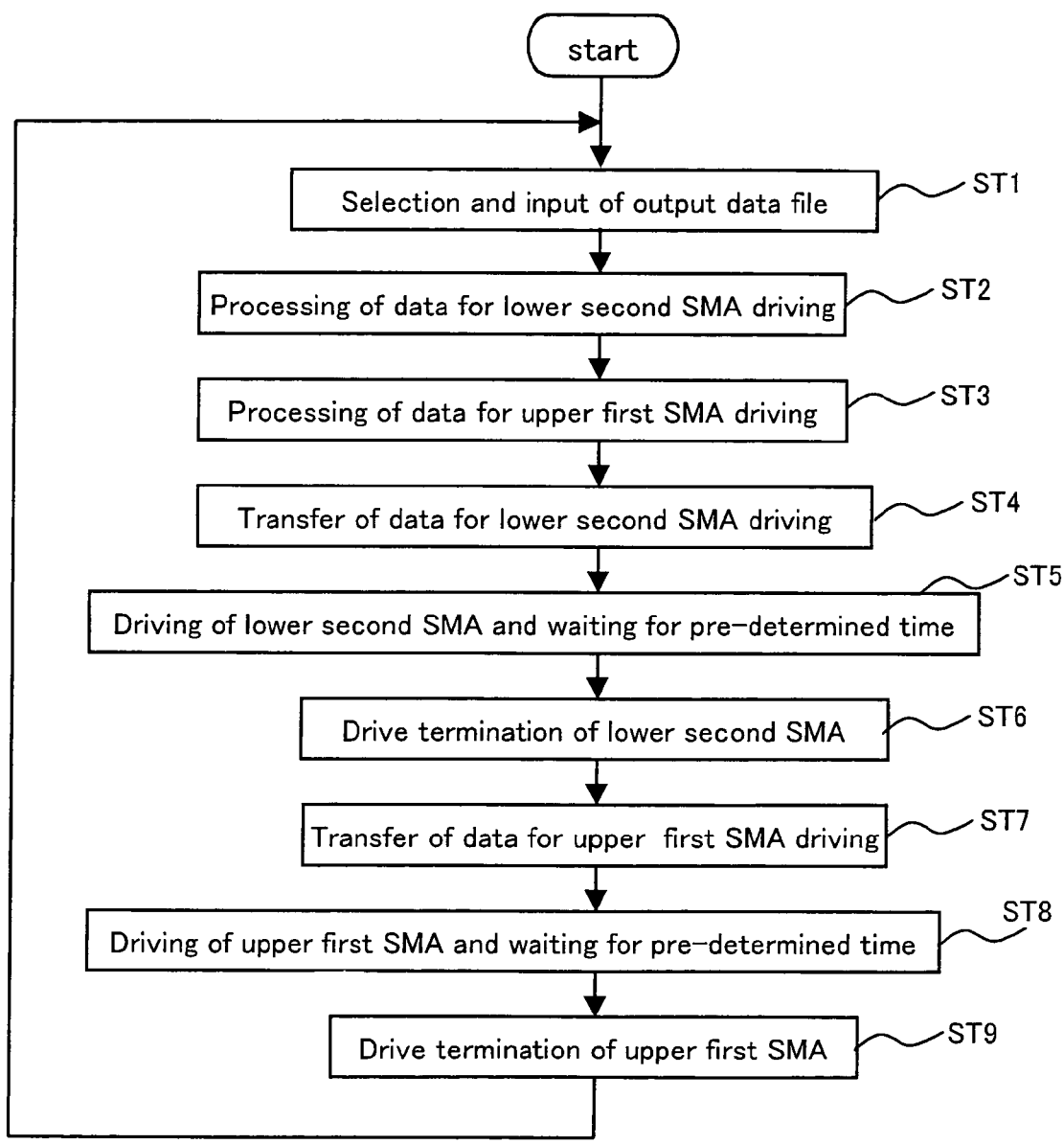
FIG. 17 is a flowchart of operation of the display device of the second form of embodiment of the present invention.

FIG. 17 is a flowchart of the operation of the display device using shape memory alloys 60 of the second form of embodiment of the present invention. In FIG. 17, at step ST1, the computer 63 of the control part 12 selects and loads the output data file prepared in advance, and transfers it to the control CPU 65 via the interface 64.

The control CPU 65 processes the data for driving of the lower second shape memory alloys coil 2 corresponding to the drive member 3 to move upward at step ST2, based on the loaded output data file, and at step ST3, it processes the data for driving of the upper first shape memory alloys coil 1 corresponding to the drive member 3 to move upward.

At step ST4, the control CPU 65 transfers the data for driving of the second shape memory alloys coil 2 processed at step ST2 to the drive circuit 4a of each driving mechanism module 20a. Each drive circuit 4a, at step ST5, sequentially drives the corresponding second shape memory alloys coil 2 via the shift resistor 4c based on said data for driving, as well as waits for the pre-determined setting time.

The drive member 3 to move upward is displaced upward by the current supply from the drive circuit 4a to the second shape memory alloys coil 2, and is fixed and held at the latch position moved upward by the magnetic body tube 9a located above magnetically fixed to the magnet plate 9c. Here, each drive circuit 4a sequentially drives the second shape memory alloys coil 2 via the shift resistor 4c, each second shape memory alloys coil 2 is driven at high speed, and each drive member 3 can be moved upward at high speed.

Thereafter at step ST6, the driving of the corresponding second shape memory alloys coil 2 is stopped. Here, though driving of the second shape memory alloys coil 2 is stopped, the drive member 3 moved upward is fixed and held by the magnetic latch part 9, respectively.

At step ST6, the control CPU 65 transfers the data for driving of the first shape memory alloys coil 1 processed at step ST3 to the drive circuit 4a of each driving mechanism module 20a using shape memory alloys. Each drive circuit 4a, at step ST7, sequentially drives the corresponding first shape memory alloys coil 1 via the shift resistor 4c based on said data for driving, as well as waits for the pre-determined setting time.

The drive member 3 to move downward is displaced upward by the current supply from the drive circuit 4a to the first shape memory alloys coil 1, and is fixed and held at the latch position moved upward by the magnetic body tube 9b located below magnetically fixed to the magnet plate 9c. Here, each drive circuit 4a sequentially drives the first shape memory alloys coil 1 via the shift resistor 4c, each first shape memory alloys coil 1 is driven at high speed, and each drive member 3 can be moved downward at high speed.

At step ST8, the driving of the corresponding first shape memory alloys coil 1 is stopped. Here, though the driving of the first shape memory alloys coil 1 is stopped, the drive member 3 moved downward is fixed and held by the magnetic latch part 9, respectively.

One cycle of drive-control of the driving mechanism 20 is completed as described above, the pin 3a of the selected drive member 3 protrudes by the pre-determined quantity on the surface of the display sheet 61, and the two dimensional display of a figure or others is performed by the protruded pin 3a. And returning to the step ST1 mentioned above, said operation is repeated, and the two dimensional display is continuously performed in turn. Here, the display sheet 61 may be detachable. Since the pin 3a of the drive member 3 is held by the magnetic latch part 9 though the display sheet 61 is detached, concave and convex display formed with the pin 3a does not disappear.

Figure 18:
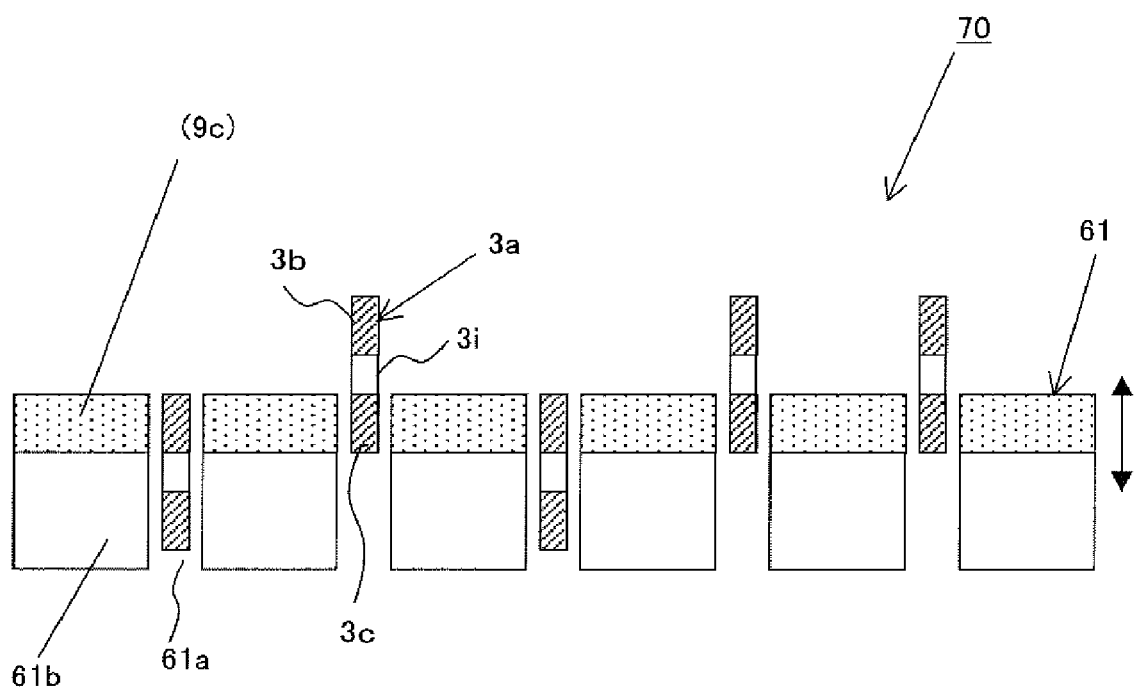
FIG. 18 is a view illustrating the main part of the second form of embodiment of the display device using shape memory alloys of the present invention.

The second form of embodiment of the display device using shape memory alloys of the present invention will be explained referring to FIG. 18. This display device using shape memory alloys 70 is a modified example of display device using shape memory alloys 60 mentioned above, and the display sheet 61 is made to be used in place of a magnet plate 9c of the magnetic latch part 9. In this case, said display sheet 61 is such that its surface region comprises plate-like magnets magnetized in the vertical direction, and an under plate 61b made of a non-magnetic body is provided below it, and the plate-like magnets and the under plate 61b have the penetration hole 61a capable of accepting the pin 3a of the drive member 3 by non-contact. Also, the upper end 3b and the lower end 3c of the pin 3a of the drive member 3 are made of a magnetic material, and the intermediate part is made of a non-magnetic material 3i. By this configuration, when the drive members 3 are moved downward like the first and the third drive members 3 from the left as shown in FIG. 18, the magnetic body 3b at the upper end of the pin 3a is magnetically fixed to the plate-like magnet (magnet plate 9c), and the lower region of the pin 3a is contained within the range of thickness of said under plate 61a. When the drive members 3 are moved upward like the second, fourth, and the fifth drive members 3 from the left as shown in FIG. 18, the magnetic body 3c at the lower end of the pin 3a is magnetically fixed to the plate-like magnet (magnet plate 9c), and the upper region of the pin 3a protrudes upward from the surface of the display sheet 61.

Figure 19:
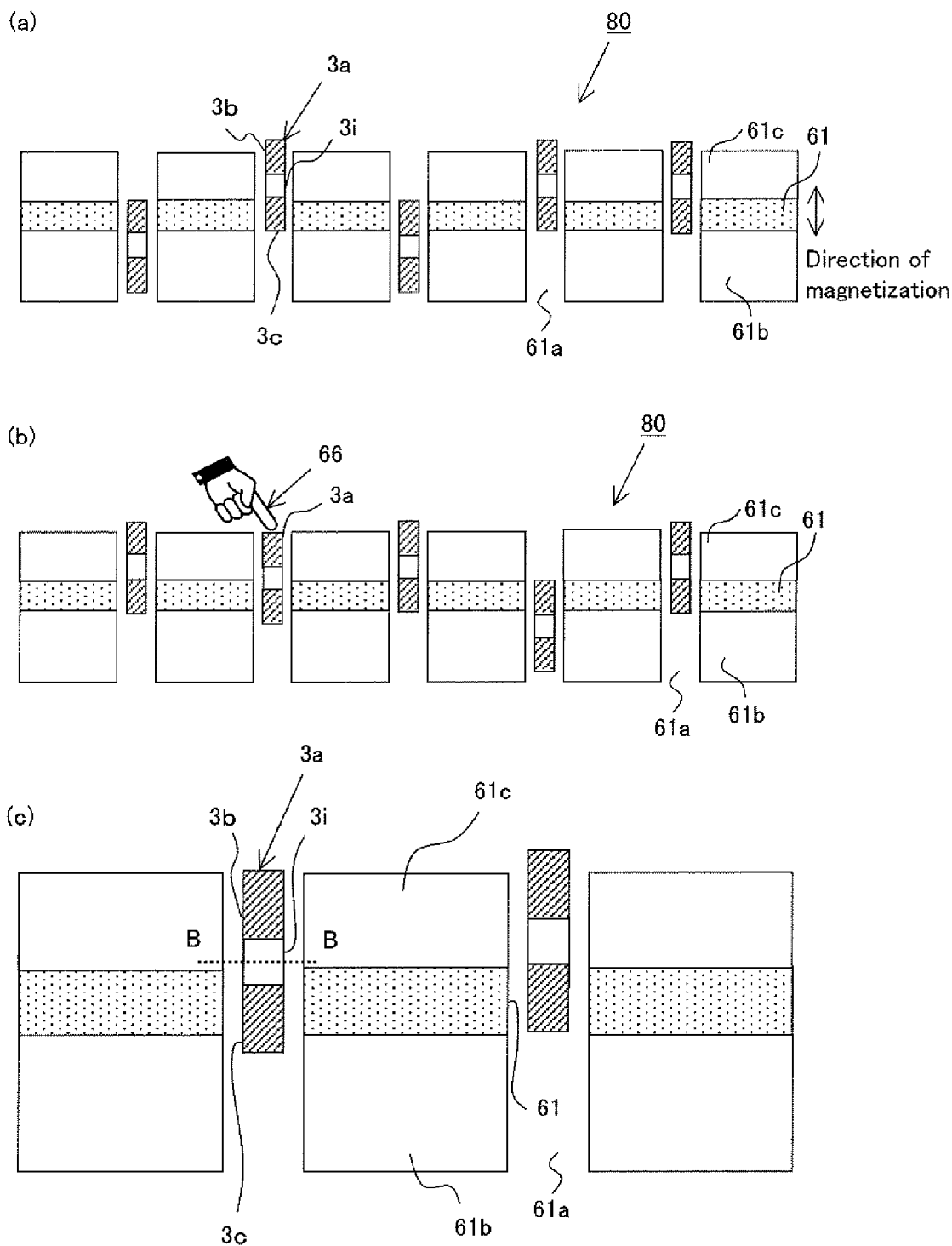
FIG. 19 is a view illustrating the main part of the third form of embodiment of the display device using shape memory alloys of the present invention.

A third form of embodiment of a display device using shape memory alloys of the present invention will be explained referring to FIG. 19. As shown in FIG. 19(a), a display device using shape memory alloys 80 is a modified example of the display device 70 mentioned above, and has a non-magnetic upper plate 61c on the display sheet 61. As shown in FIG. 19 (b), even if the pin 3a of the drive member is pushed down by a human finger 66, the upper position of the pin 3a of the drive member is same as the surface position of the upper plate 61c, and is not pushed farther downward. In case that the central position shown as B-B of the non-magnetic body 3i of the drive member is located above the magnetic body as the display sheet 61 (See FIG. 7(c).), it can be latched back again to the original position by magnetism after the human finger is released.

Figure 20:
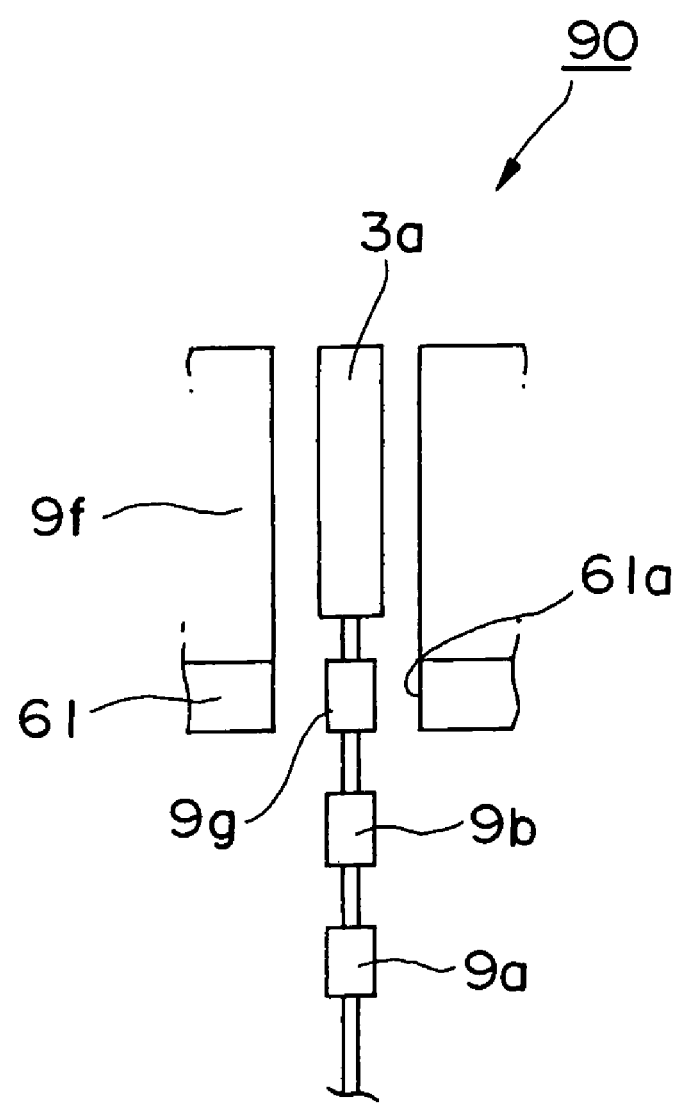
FIG. 20 is a view illustrating the main part of the fourth form of embodiment of the display device using shape memory alloys of the present invention.

A fourth form of embodiment of a display device using shape memory alloys of the present invention will be explained referring to FIG. 20. Basically, this display device using shape memory alloys 90 has the same configuration as the display device using shape memory alloys 60 as shown in FIG. 15, but it differs in that the magnetic latch part 9 has multi-step latch positions by being provided with a plurality of, in case of illustration, three magnetic body tubes 9a, 9b, and 9g attached to the drive member 3 separately in the axis direction in the part extending upward from the upper hem of the substrate 4 of the drive member 3. The control CPU 65 is such that the electric current value applied to the shape memory alloys coil is changed so that each drive member 3 of each driving mechanism module 20a is moved downward, intermediate, and upward, the first and the second shape memory alloys coils 1 and 2 are drive-controlled, each drive member 3 is magnetically fixed by the magnet plate 9c of any of magnetic body tubes 9a, 9b, and 9g, and fixed and held at each latch position. Thus, the display device using shape memory alloys 90 can perform three gradated display by the pin 3a of each drive member 3 protruding three steps on the surface of the display sheet 61.

Figure 21:
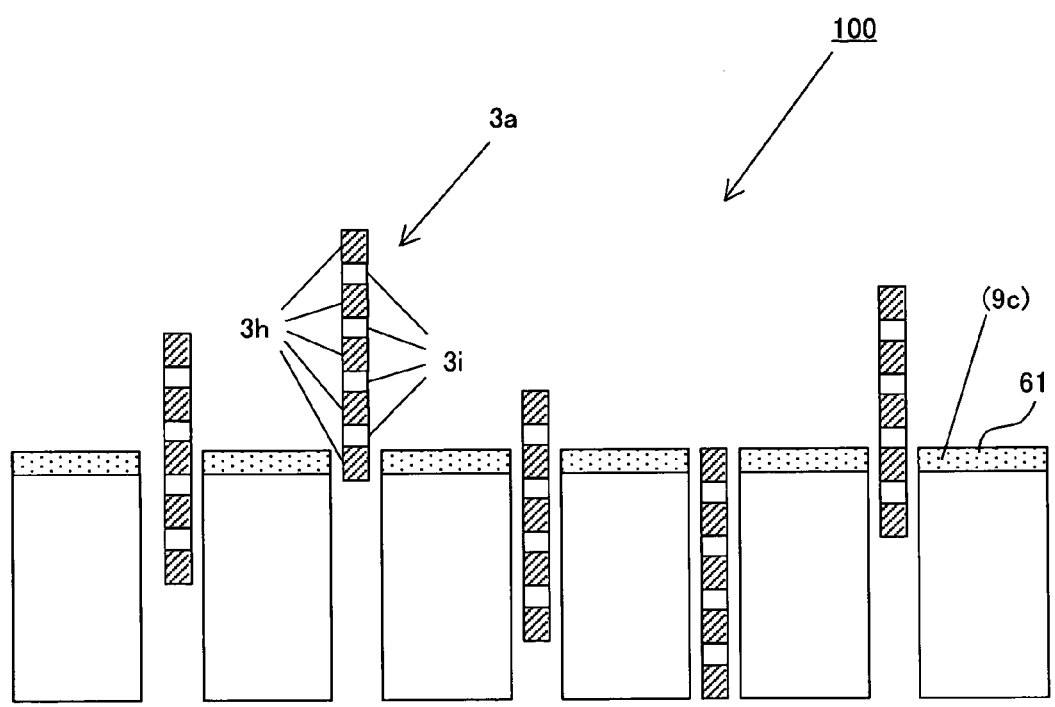
FIG. 21 is a view illustrating the main part of the fifth form of embodiment of the display device using shape memory alloys of the present invention.

A fifth form of embodiment of a display device using shape memory alloys of the present invention will be explained referring to FIG. 21. This display device using shape memory alloys 100 is a modified example of the display device 70 or 80 mentioned above, and the display sheet 61 is made to be used also in place of a magnet plate 9c of the magnetic latch part 9, as well as five positions between the upper end and the lower end 3 of the pin 3a of the drive member 3 are made of magnetic body 3h, and their intermediate part is made of non-magnetic body 3i. As shown in FIG. 21, the drive member 3 is fixed and held at each latch position by each magnetic body 3h of said pin 3a magnetically fixed to respective plate-like magnet (magnet plate 9c). Therefore, the display device using shape memory alloys 90 can perform five gradated display by the pin 3a of each drive member 3 protruding five steps on the surface of the display sheet 61.

According to the display device using shape memory alloys of the present invention, the drive member 3 is provided with magnetic bodies 3b, 3c, and 3h, and since the displacement generated when the pulsed current flows to each of shape memory alloys coils 1 and 2 is immediately latched, the current to maintain said displacement is unnecessary. Thereby, the power consumption to give displacement to the drive member of the driving mechanism using shape memory alloys 20 can be remarkably reduced. Therefore, if the height of the pin 3a arranged two dimensionally is driven multi-stepped, a mountain shape of a map, for example, can be displayed three dimensionally at high accuracy and high speed by small power consumption. Also, for example, displays and various switches of play equipments of which various parts are moved can be realized by arranging a plurality of pins 3a in one line at high density.

According to the display device using shape memory alloys of the present invention, the driving mechanism can be made up with one substrate, contrary to the pin driving device using a shape memory alloys coil of a conventional example of Patent Reference 3 as having a three dimensional structure. Thereby, the number of parts is reduced, and the assembly is easy. Thus, the device can be made compact, driven at high speed by small power, and manufactured at low cost compared with the conventional display device using a shape memory alloys coil.

A display sheet write-in device equipped with the driving mechanism using shape memory alloys of the third form of embodiment of the present invention will be explained.

Figure 22:
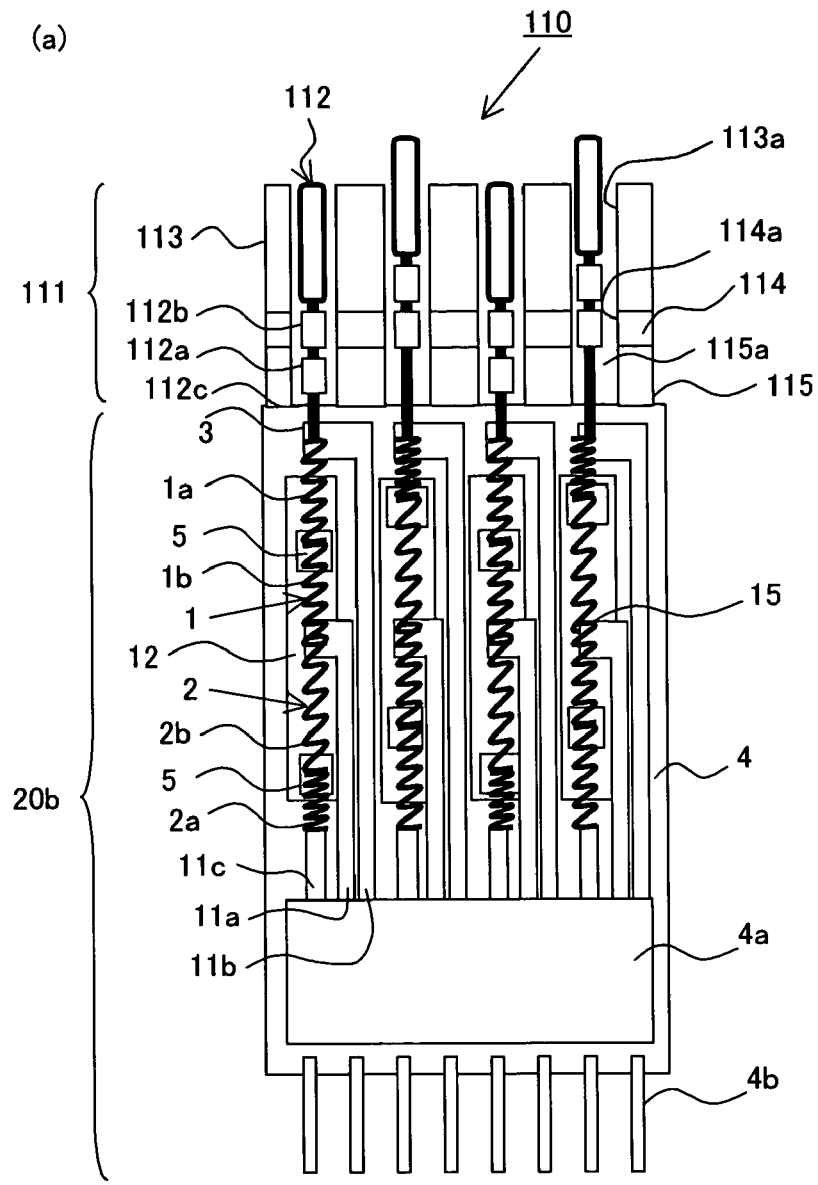
FIG. 22 is a view diagrammatically illustrating a display sheet write-in device using shape memory alloys of the third form of embodiment of the present invention, (a) the configuration and (b) a display sheet with the write-in data.
Figure 22:
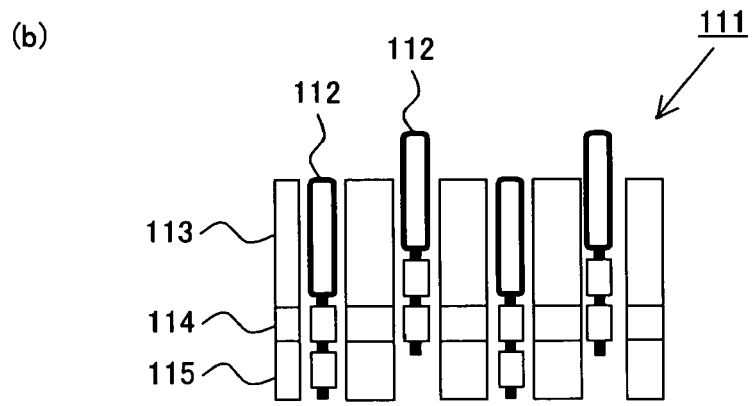

FIG. 22 is a view diagrammatically illustrating a display sheet write-in device using shape memory alloys of the third form of embodiment of the present invention, (a) the configuration and (b) a display sheet with the write-in data. This display sheet write-in device using shape memory alloys 110 comprises a driving mechanism module using shape memory alloys 20b, a detachable display sheet 111 arranged thereon, a display pin 112, and a control part 62 not shown in the figure. The driving mechanism module using shape memory alloys 20b has basically the same structure as the driving mechanism using shape memory alloys 20a except that provided with the detachable display sheet 111.

The display sheet 111 is integrated by an upper plate 113 and a lower plate 115 made of a non-magnetic material, and a magnet plate 114 as a magnetic latch part, and hole parts 113a, 114a, and 115a are opened at the positions corresponding to the drive member 3. At each of the drive members 3, a display pin 112 is inserted detachably in the direction upward of the paper surface, that is, the axis direction. For example, an aperture part may be provided to the uppermost part of the drive member 3, and the lower part 112c of the display pin may be inserted therein detachably. The display pin 112 may be provided with magnetic body tubes 112a and 112b, and other parts may be of non-magnetic material.

In said display sheet write-in device 110, when the drive member 3 is driven by the control part 62 based on data, the magnetic body tubes 112a and 112b of the display pin 112 connected to the drive member 3 are latched to the magnet plate 114 of the display sheet 111, and detached from the drive member 3. In this state, the display sheet 110 is separated from the driving mechanism module using shape memory alloys 20b. The display pins 112 are arranged in the vertical direction depending upon data, and the data is written in by the concave and convex states on the display sheet 111 (See FIG. 22(b).). After the data of the display sheet 111 is detected, the data can be erased by that the display pin 112 is returned to the original non-protruded state.

The configuration of said drive member 3, the driving mechanism, and the control part 62 is similar to said display device using shape memory alloys. The configuration of the display pin can be made the desired multi-value display by the number of magnetic body tubes. By said display sheet write-in device using shape memory alloys 110, Braille data and image data can be written into the display sheet 111. Also, since the display pin 112 is latched, thus the manufactured display sheet 111 is non-volatile data, and can be touched or stored any time after write-in. After readout of the data in the display sheet 111, rewrite-in and delete of the data for leak prevention are possible. Further, since the display sheet can be detached from the write-in device, the display sheet can be treated as if a printing paper.

EXAMPLE

Using the driving mechanism having shape memory alloys 20 of the structure shown in FIG. 1, a display device capable of two dimensional display of 10×10 was fabricated as shown in FIGS. 15 and 16. As the material of shape memory alloys, Ni—Ti wire of diameter 50 μm was used. A shape memory alloys coil of the outer diameter 0.2 mm and of dense coil (no pitch) as the natural length part of the shape memory alloys coil was prepared. For a pin 3, piano wire or brass wire of diameter 0.3 mm was used. NdFeB was used as a magnet plate 9c of the magnetic latch part 9, and Ni tube was used as the pin magnetic bodies 3b and 3c.

When the control signal of current drive to the shape memory alloys coil 1 or 2 was made 120 mA/0.3 sec, each drive member 3 was continuously moved at 0.3 second, and could be latched. In this case, the holding force by the magnetic latch part was about 10 gf, and the displacement was about 2 mm. These generation force, displacement, and drive speed of said drive member 3 were satisfying values for drive speed as the generation force of the pin 8 gf and displacement 0.8 mm required for a Braille display and a probe type display devices.

It is needless to say that the present invention is not limited to the above-described examples, and various modification within the range of the invention as set forth in claims, which is also included in the range of the present invention. It is obvious that the size of shape memory alloys coil, the structures of drive members and latch parts, and the driving method of pins may be properly designed and manufactured according to their object.

What is claimed is:

1. A driving mechanism using shape memory alloys comprising:
   a module wherein a first and a second shape memory alloy coils connected mutually in series in the axis direction, a drive member, and a fixing member are provided on one common substrate;
   a magnetic latch to hold said drive member; and a drive circuit to supply electricity to said first and the second shape memory alloy coils;

said magnetic latch is made of a magnet plate and a plurality of magnetic bodies provided to said drive member; characterized in that said drive member is connected to the first and the second shape memory alloys coils and extending in the axis direction, said magnetic latch is made of a magnet plate and a plurality of magnetic bodies provided to said drive member, said magnet plate of said magnetic latch is provided with a penetration hole through which said drive member is penetrated without contact and said magnet plate is magnetized in the axis direction of said drive member, said magnetic bodies are arranged mutually separated in the axis direction of the drive member, said first and the second shape memory alloy coils are selectively heated by electrical driving by said drive circuit, said drive member is moved in the axis direction by compressing or extending of the heated first or the second shape memory alloy coils, and said drive member is fixed and held in the axis direction by magnetically fixed to said magnetic latch.

2. A driving mechanism using shape memory alloys comprising:

a plurality of groups of a module with a first and a second shape memory alloys coils mutually connected in series in the axis direction;

a drive member and a fixing member are arranged on one substrate; and a magnetic latch part to hold said drive member, characterized in that;

said first and second shape memory alloys coils are sequentially connected in series as a natural length part, its extended part, or compressed part of the first shape memory alloys coil, the extended part, or compressed part, and its natural length part of the second shape memory alloys coil in turn, the series-connected part of one end of the natural length part and one end of the extended or compressed part of each of said first and second shape memory alloys coils is connected to the drive member via the fixing member arranged in an aperture part provided to said substrate, and said first and second shape memory alloys coils, said drive member, and said fixing member are movably held about in parallel to said substrate without contact to said substrate, the other end of the natural length part of said first shape memory alloys coil and the other end of the natural length part of said second shape memory alloys coil are respectively connected to a ground electrode pattern provided to said substrate, the other end of the extended or the compressed part of said first shape memory alloys coil and the other end of the extended or the compressed part of said second shape memory alloys coil are connected to a common electrode wiring pattern provided to said substrate, said magnetic latch part includes a magnet plate and a plurality of magnetic bodies, said magnet plate is provided with a penetration hole through which said drive member penetrates without contact, and said magnetic bodies are mutually arranged separately in the axis direction, and a drive circuit provided to said substrate selectively current-drives said first and second shape memory alloys coils, said drive member moves in the axis direction by extending or compressing said driven first or second shape memory alloys coils by heating, and said drive member is magnetically fixed to said magnetic latch part, thereby fixed and held at multi-steps in the axis direction.

3. The driving mechanism using shape memory alloys as set forth in claim 2, characterized in that said drive circuit has a shift resistor, and said plurality of groups of the first and the second shape memory alloys coils are current-driven by said shift resistor.

4. The driving mechanism using shape memory alloys as set forth in claims 1 or 2, characterized in that said magnetic latch part comprises one or more magnetic bodies provided to said drive member, and a latch member provided with a plurality of concave parts mutually arranged separately in the axis direction facing the displacement region of said magnetic bodies, and the concave part region of said latch member is magnetized.

5. A display device equipped with a driving mechanism using shape memory alloys comprising:

at least one driving mechanism using shape memory alloys;

a display sheet arranged in parallel to a magnet plate and having a penetration hole through which each drive member penetrates vertically; and a control part into which data is input, characterized in that;

said driving mechanism is provided with a plurality of groups of a module wherein a first and a second shape memory alloys coils mutually connected in series in the axis direction, a drive member, and a fixing member are arranged on one common substrate, and a magnetic latch part to hold said drive member, said first and second shape memory alloys coils are sequentially connected in series as a natural length part, its extended part, or compressed part of the first shape memory alloys coil, the extended part, or compressed part, and its natural length part of the second shape memory alloys coil in turn, the series-connected part of one end of the natural length part and one end of the extended or compressed part of each of said first and second shape memory alloys coils is connected to the drive member via the fixing member arranged in an aperture part provided to said substrate, and said first and second shape memory alloys coils, said drive member, and said fixing member are movably held about in parallel to said substrate without contact to said substrate, the other end of the natural length part of said first shape memory alloys coil and the other end of the natural length part of said second shape memory alloys coil are respectively connected to a ground electrode pattern provided to said substrate, the other end of the extended or the compressed part of said first shape memory alloys coil and the other end of the extended or the compressed part of said second shape memory alloys coil are connected to a common electrode wiring pattern provided to said substrate, said magnetic latch part includes a magnet plate and a plurality of magnetic bodies, said magnet plate is provided with a penetration hole through which said drive member penetrates without contact, and said magnetic bodies are mutually arranged separately in the axis direction, a drive circuit provided to said substrate selectively current-drives said first and second shape memory alloys coils, said drive member moves in the axis direction by extending or compressing said driven first or second shape memory alloys coils by heating, and said drive member is magnetically fixed to said magnetic latch part, thereby fixed and held at multi-steps in the axis direction, and a display is conducted by the protruding quantity of each drive member corresponding to said data.

6. The display device provided with a driving mechanism using shape memory alloys as set forth in claim 5, characterized in that each tip of said drive member is arranged in a dot matrix on the surface of said display sheet.

7. A display sheet write-in device equipped with a driving mechanism using shape memory alloys comprising:

at least one driving mechanism using shape memory alloys;

a detachable display sheet arranged in parallel to a magnet plate and having a penetration hole through which each drive member penetrates vertically in the tip region of each drive member of said driving mechanism;

a display pin detachably inserted into the tip of each drive member; and a control part into which data is input and write-in is conducted on said display sheet by the protruding quantity of each display pin corresponding to said data, characterized in that;

said driving mechanism is provided with a plurality of groups of a module wherein a first and a second shape memory alloys coils mutually connected in series in the axis direction, a drive member, and a fixing member are arranged on one common substrate, and a magnetic latch part to hold said drive member, said first and second shape memory alloys coils are sequentially connected in series as a natural length part, its extended part, or compressed part of the first shape memory alloys coil, the extended part, or compressed part, and its natural length part of the second shape memory alloys coil in turn, the series-connected part of one end of the natural length part and one end of the extended or compressed part of each of said first and second shape memory alloys coils is connected to the drive member via the fixing member arranged in an aperture part provided to said substrate, and said first and second shape memory alloys coils, said drive member, and said fixing member are movably held about in parallel to said substrate without contact to said substrate, the other end of the natural length part of said first shape memory alloys coil and the other end of the natural length part of said second shape memory alloys coil are respectively connected to a ground electrode pattern provided to said substrate, the other end of the extended or the compressed part of said first shape memory alloys coil and the other end of the extended or the compressed part of said second shape memory alloys coil are connected to a common electrode wiring pattern provided to said substrate, said magnetic latch part includes a magnet plate and a plurality of magnetic bodies, said magnet plate is provided with a penetration hole through which said drive member penetrates without contact, and said magnetic bodies are mutually arranged separately in the axis direction, a drive circuit provided to said substrate selectively current-drives said first and second shape memory alloys coils, said drive member moves in the axis direction by extending or compressing said driven first or second shape memory alloys coils by heating, and said drive member is magnetically fixed to said magnetic latch part, thereby fixed and held at multi-steps in the axis direction, and said display pin is latched to said display sheet depending upon the axis direction moving quantity of said each drive member, said display pin is detached from said drive member, thereby is fixed and held to the display sheet by magnetism of said latch part.

8. A display sheet, characterized in that data is written in by the display sheet write-in device equipped with a driving mechanism using shape memory alloys as set forth in claim 7.

9. A driving mechanism using shape memory alloys comprising:

a first and a second shape memory alloys coils mutually connected in series in the axis direction;

a drive member made of a magnetic body material connected to said first and second shape memory alloys coils;

a drive circuit to supply electric current to said first and second shape memory alloys coils; and a magnetic latch part to hold said drive member, characterized in that;

said magnetic latch part has a plurality of concave parts mutually arranged separately in the axis direction, and said concave part region is magnetized, said first and second shape memory alloys coils are selectively current-driven and heated by said drive circuit, and said drive member is moved along a plurality of concave parts of the latch part by compressing or extending said heated first or second shape memory alloys coil, and said drive member is magnetically fixed to said magnetic latch part, thereby fixed and held.

10. The driving mechanism using shape memory alloys as set forth in claim 9, characterized in that said first and second shape memory alloys coils comprise a extended part or a compressed part, the ends of the extended or the compressed part of said first and second shape memory alloys coils are mutually connected in series, the series-connected part of said first and second shape memory alloys coils is connected to said drive member to be a common electrode, both ends not series-connected of the extended or the compressed part of said first and second shape memory alloys coils are connected to both ends where are not provided a plurality of concave parts of said latch member to be a ground electrode.

11. The driving mechanism using shape memory alloys as set forth in claim 9, characterized in that said latch member itself is magnetized.

12. The driving mechanism using shape memory alloys as set forth in claim 9, characterized in that a magnet is provided to the backside of said latch member.

13. The driving mechanism using shape memory alloys as set forth in claim 9, characterized in that the concave part of said latch member is arranged in a bending shape.

14. The driving mechanism using shape memory alloys as set forth in claim 9, characterized in that the concave part of said latch member is made flexible to bend.

15. The driving mechanism using shape memory alloys as set forth in claim 9, characterized in that said latch member is further provided with a magnetic sensor.

16. An optical device equipped with a driving mechanism using shape memory alloys and a drive part driven by said driving mechanism, characterized in that;

said driving mechanism comprising:

a first and a second shape memory alloys coils mutually connected in series in the axis direction;

a drive member made of a magnetic body material connected to said first and second shape memory alloys coils;

a drive circuit to supply electric current to said first and second shape memory alloys coils; and a magnetic latch part to hold said drive member, and said magnetic latch part has a plurality of concave parts mutually arranged separately in the axis direction, and said concave part region is magnetized, said first and second shape memory alloys coils are selectively current-driven and heated by said drive circuit, and said drive member is moved along a plurality of concave parts of said latch part by compressing or extending said heated first or second shape memory alloys coil, said drive member is magnetically fixed to said magnetic latch part, thereby fixed and held, and the drive part of said optical device is fixed by the drive member made of a magnetic body material of said driving mechanism, and its position is drive-controlled.

17. The optical device equipped with the driving mechanism using shape memory alloys as set forth in claim 16, characterized in that the drive part of said optical device is a drive part of an optical fiber.

18. The optical device equipped with the driving mechanism using shape memory alloys as set forth in claim 16, characterized in that the drive part of said optical device is a drive part of a lens.

19. A catheter equipped with a driving mechanism using shape memory alloys, characterized in that;

said driving mechanism comprising:

a first and a second shape memory alloys coils mutually connected in series in the axis direction;

a drive member made of a magnetic body material connected to said first and second shape memory alloys coils;

a drive circuit to supply electric current to said first and second shape memory alloys coils; and a magnetic latch part to hold said drive member, and said magnetic latch part has a plurality of concave parts mutually arranged separately in the axis direction, and said concave part region is magnetized, said first and second shape memory alloys coils are selectively current-driven and heated by said drive circuit, and said drive member is moved along a plurality of concave parts of said latch part by compressing or extending said heated first or second shape memory alloys coil, and said drive member is magnetically fixed to said magnetic latch part, thereby fixed and held.

* * * * *